(12) United States Patent
Kim et al.

(10) Patent No.: US 11,488,500 B2
(45) Date of Patent: Nov. 1, 2022

(54) DISPLAY DEVICE

(71) Applicant: Samsung Display Co., Ltd., Yongin-Si (KR)

(72) Inventors: Min-Sung Kim, Hwaseong-si (KR); Hyoyul Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/231,433

(22) Filed: Apr. 15, 2021

(65) Prior Publication Data

US 2022/0005386 A1 Jan. 6, 2022

(30) Foreign Application Priority Data

Jul. 1, 2020 (KR) .................. 10-2020-0080993

(51) Int. Cl.
*G06F 1/20* (2006.01)
*G06F 1/16* (2006.01)
*G09F 9/30* (2006.01)

(52) U.S. Cl.
CPC ............ *G09F 9/301* (2013.01); *G06F 1/1616* (2013.01); *G06F 1/203* (2013.01)

(58) Field of Classification Search
CPC ........ G06F 9/301; G06F 1/1616; G06F 1/203; G06F 1/1637
See application file for complete search history.

(56) References Cited

U.S. PATENT DOCUMENTS

| | | | | |
|---|---|---|---|---|
| 10,164,208 B2 * | 12/2018 | Lee | ..................... | H01L 51/5253 |
| 10,440,817 B2 | 10/2019 | Choi et al. | | |
| 10,490,771 B2 | 11/2019 | Kim et al. | | |
| 2014/0355195 A1 * | 12/2014 | Kee | ..................... | G06F 1/1641 |
| | | | | 361/679.27 |
| 2016/0209874 A1 * | 7/2016 | Choi | ..................... | H05K 1/028 |
| 2018/0150108 A1 * | 5/2018 | Song | ..................... | H05K 1/028 |
| 2018/0192527 A1 * | 7/2018 | Yun | ..................... | G06F 1/1681 |
| 2020/0022267 A1 | 1/2020 | Han et al. | | |

FOREIGN PATENT DOCUMENTS

| | | | | |
|---|---|---|---|---|
| KR | 1020160089583 A | 7/2016 | | |
| KR | 1020180079091 A | 7/2018 | | |
| KR | 1020190053691 A | 5/2019 | | |
| KR | 1020190080740 A | 7/2019 | | |
| KR | 1020190081335 A | 7/2019 | | |
| KR | 10-2021-0083713 | * 12/2019 | ........... | G06F 1/1652 |
| KR | 1020200006646 A | 1/2020 | | |

* cited by examiner

*Primary Examiner* — Abhishek M Rathod
(74) *Attorney, Agent, or Firm* — Cantor Colburn LLP

(57) ABSTRACT

A display device includes a display panel including a folding area folded about a folding axis extending in a first direction, a first non-folding area, and a second non-folding area spaced apart from the first non-folding area with the folding area interposed therebetween in a second direction crossing the first direction, a cover member disposed on the display panel, a support member disposed between the display panel and the cover member, a heat dissipation member which is disposed between the support member and the cover member and through which a first opening and a second opening are defined, a first adhesive member disposed in the first opening, and a second adhesive member disposed in the second opening. The first adhesive member overlaps the first non-folding area, and the second adhesive member overlaps the second non-folding area.

15 Claims, 15 Drawing Sheets

FIG. 4
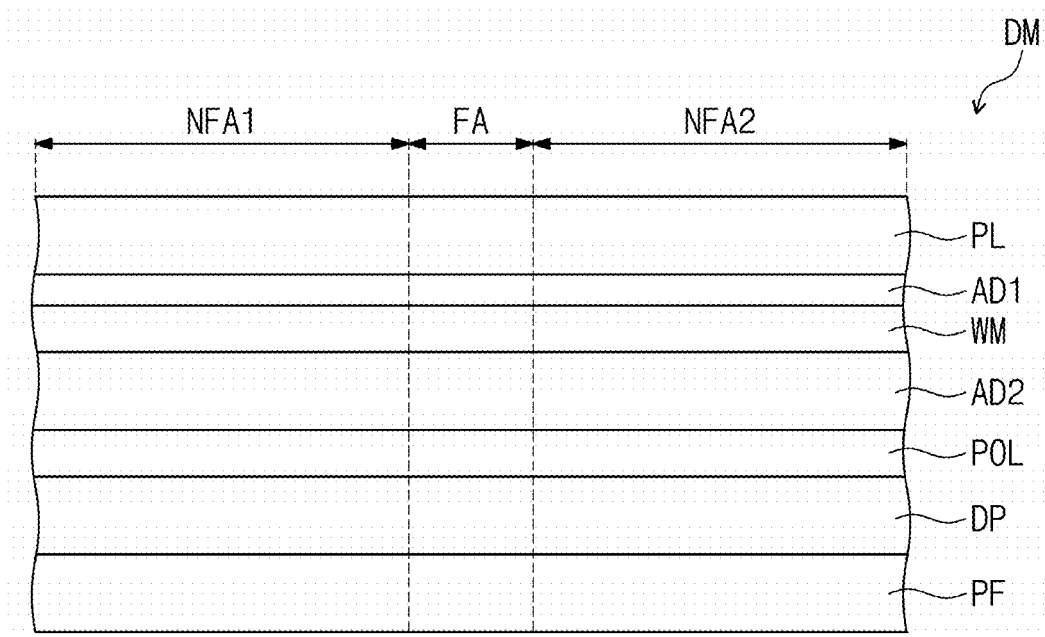
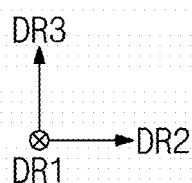

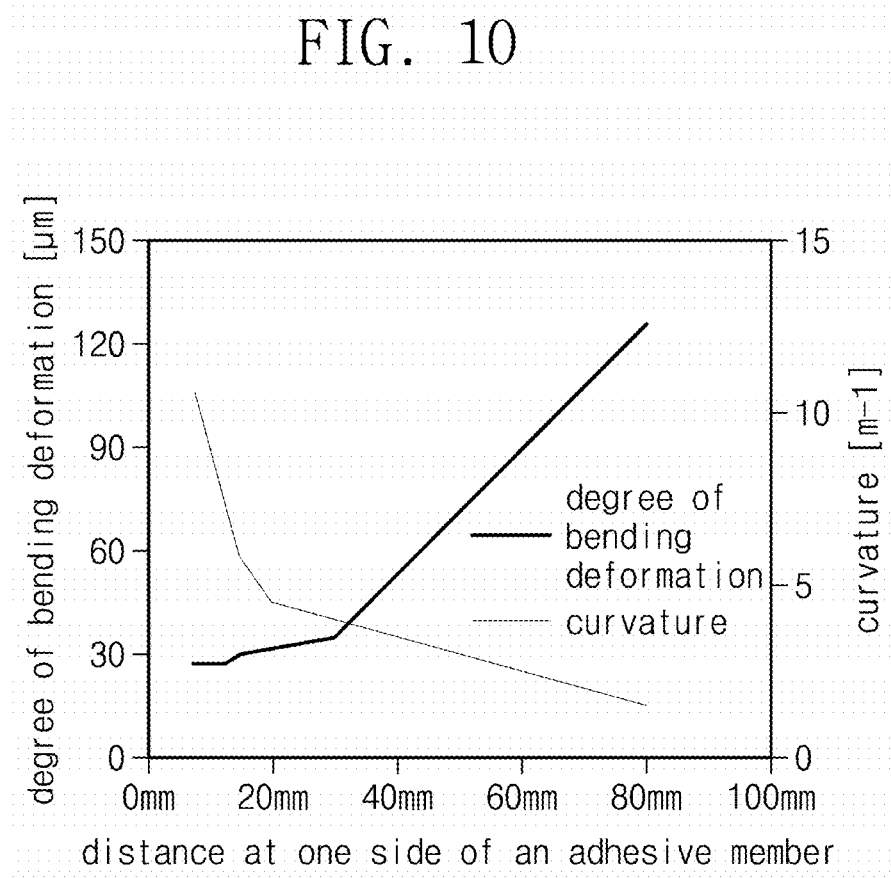

DISPLAY DEVICE

This application claims priority to Korean Patent Application No. 10-2020-0080993, filed on Jul. 1, 2020, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device capable of reducing a visual recognition phenomenon of a bending deformation.

2. Description of the Related Art

A display device displays various images through a display screen to provide a user with information. In general, the display device displays the information through an assigned screen. The display device is applied to various electronic items, such as a smartphone, a notebook computer, a television, etc., to display the images.

In recent years, flexible display devices including a flexible display panel that is foldable are being developed. In contrast with a rigid display device, the flexible display device is deformable, e.g., foldable, rollable, or bendable. The flexible display device, which is changeable to various shapes, is easy to carry and improves a user's convenience.

SUMMARY

A bending deformation occurs or is recognized in a folding area of the foldable flexible display device, and thus, researches to prevent the bending deformation are desired.

Embodiments of the invention provide a display device capable of reducing a visual recognition phenomenon of a bending deformation in a folding area.

An embodiment of the invention provides a display device including a display panel including a folding area folded about a folding axis extending in a first direction, a first non-folding area, and a second non-folding area spaced apart from the first non-folding area with the folding area interposed therebetween in a second direction crossing the first direction, a cover member disposed on the display panel, a support member disposed between the display panel and the cover member, a heat dissipation member which is disposed between the support member and the cover member and through which a first opening and a second opening are defined, a first adhesive member disposed in the first opening, and a second adhesive member disposed in the second opening. The first adhesive member overlaps the first non-folding area, and the second adhesive member overlaps the second non-folding area.

In an embodiment, each of the first adhesive member and the second adhesive member may not overlap the folding area.

In an embodiment, the first adhesive member may be spaced apart from the folding axis by a first distance in the second direction, the second adhesive member may be spaced apart from the folding axis by a second distance in a direction opposite to the second direction, a maximum value of the first distance may correspond to a minimum distance between the folding axis and a center of the first non-folding area, and a maximum value of the second distance may correspond to a minimum distance between the folding axis and a center of the second non-folding area.

In an embodiment, each of the first and second distances may be equal to or greater than about 15 millimeters (mm) and equal to or smaller than about 35 mm.

In an embodiment, a maximum value of a sum of the first distance and the second distance may correspond to a distance between the center of the first non-folding area and the center of the second non-folding area.

In an embodiment, a sum of the first distance and the second distance may be equal to or greater than about 35 mm and equal to or smaller than about 65 mm.

In an embodiment, each of the first adhesive member and the second adhesive member may have a bar shape.

In an embodiment, each of the first adhesive member and the second adhesive member may be disposed substantially parallel to the first direction.

In an embodiment, the first adhesive member may include a plurality of first adhesive portions spaced apart from each other, and the second adhesive member may include a plurality of second adhesive portions spaced apart from each other.

In an embodiment, each of the first opening and the second opening may be provided in plural, the plurality of first adhesive portions may be respectively disposed in first openings, and the plurality of second adhesive portions are respectively disposed in second openings.

In an embodiment, the plurality of first adhesive portions and the plurality of second adhesive portions may be arranged substantially parallel to the first direction.

In an embodiment, the first adhesive member and the second adhesive member may be symmetrical with each other with respect to the folding axis.

In an embodiment, the heat dissipation member may include a first heat dissipation portion that overlaps at least a portion of the first non-folding area and a second heat dissipation portion that is spaced apart from the first heat dissipation portion and overlaps at least a portion of the second non-folding area, the first opening may be defined through the first heat dissipation portion, and the second opening may be defined through the second heat dissipation portion.

In an embodiment, the support member may include a first support portion that overlaps the first non-folding area and a second support portion that is spaced apart from the first support portion and overlaps the second non-folding area.

In an embodiment, the support member may include a support portion through which a plurality of openings is defined in an area corresponding to the folding area.

An embodiment of the invention provides a display device including a display panel including a folding area folded about a folding axis extending in a first direction, a first non-folding area, and a second non-folding area spaced apart from the first non-folding area with the folding area interposed therebetween in a second direction crossing the first direction, a cover member disposed on the display panel, a support member disposed between the display panel and the cover member, a first adhesive member disposed between the support member and the cover member and overlapping the first non-folding area, and a second adhesive member disposed between the support member and the cover member, overlapping the second non-folding area, and spaced apart from the first adhesive member in the second direction by a first gap. A maximum value of the first gap corresponds to a distance between a center of the first non-folding area and a center of the second non-folding area.

In an embodiment, the display device may further include an impact absorbing member disposed between the first adhesive member and the support member and between the second adhesive member and the support member.

In an embodiment, the display device may further include an impact absorbing member which is disposed on the support member and through which a first opening and a second opening are defined. The first adhesive member may be disposed in the first opening, and the second adhesive member may be disposed in the second opening.

In an embodiment, the first adhesive member may include a plurality of first adhesive portions spaced apart from each other, and the second adhesive member may include a plurality of second adhesive portions spaced apart from each other.

In an embodiment, each of the first adhesive member and the second adhesive member may not overlap the folding area, and the first gap may be equal to or greater than about 35 mm and equal to or smaller than about 65 mm.

According to the above, the bending deformation degree of the folding area of the display device may be reduced without remarkably increasing the curvature of the bending portion of the display device. Thus, the degree of visibility of the bending deformation from the outside may be reduced.

BRIEF DESCRIPTION OF THE DRAWINGS

The above and other advantages of the invention will become readily apparent by reference to the following detailed description when considered in conjunction with the accompanying drawings in which:

FIG. 4 is a cross-sectional view showing an embodiment of a display module according to the invention;

FIG. 10 is a graph showing variations in a degree of bending deformation and a curvature value as a function of a distance at one side of an adhesive member;

DETAILED DESCRIPTION

Figure 1A:
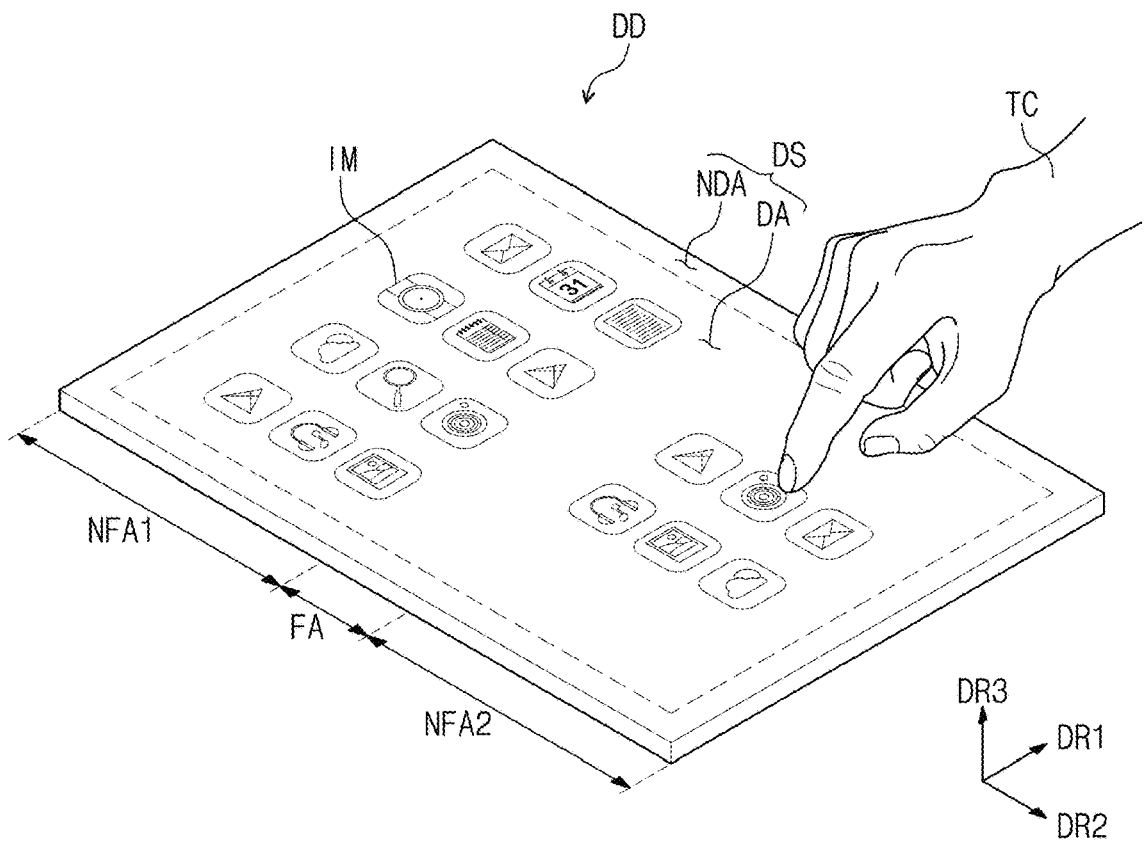
FIG. 1A is a perspective view showing an embodiment of a display device according to the invention.

The disclosure may be variously modified and realized in many different forms, and thus specific embodiments will be exemplified in the drawings and described in detail hereinbelow. However, the disclosure should not be limited to the specific disclosed forms, and be construed to include all modifications, equivalents, or replacements included in the spirit and scope of the disclosure.

In the disclosure, it will be understood that when an element or layer is referred to as being "on", "connected to" or "coupled to" another element or layer, it may be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the drawing figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, a display device according to the invention will be explained in detail with reference to the accompanying drawings.

Figure 1B:
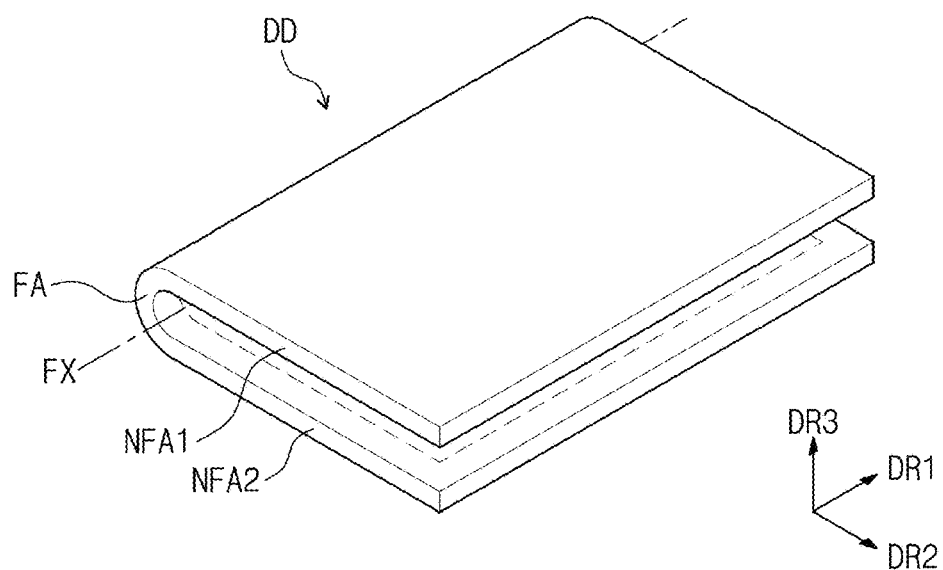
FIG. 1B is a perspective view showing the display device shown in FIG. 1A in a folded state.
Figure 2A:
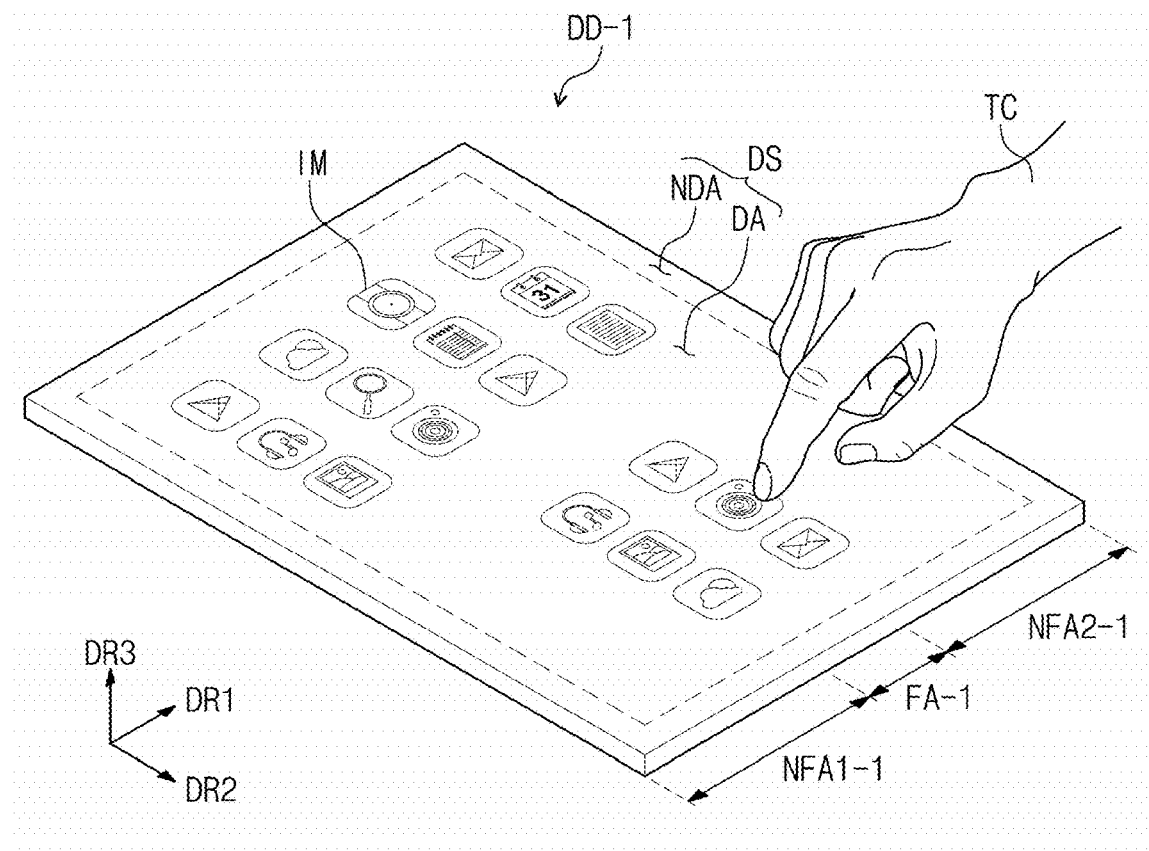
FIG. 2A is a perspective view showing an embodiment of a display device according to the invention.
Figure 2B:
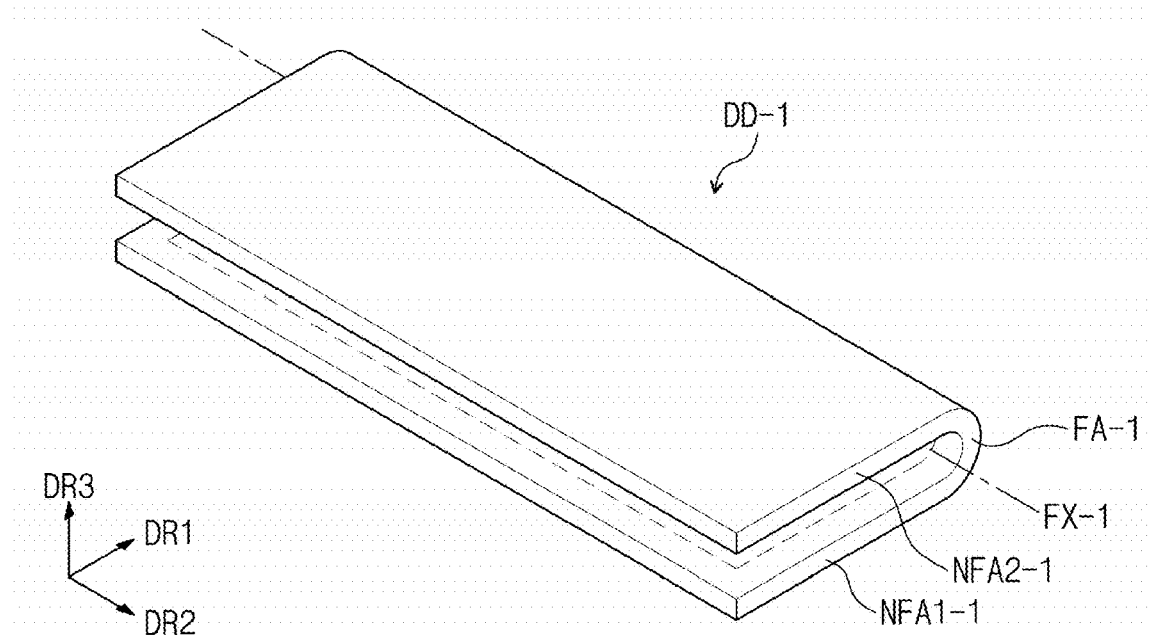
FIG. 2B is a perspective view showing the display device shown in FIG. 2A in a folded state.

FIGS. 1A and 2A are perspective views showing an embodiment of display devices DD and DD-1 according to the invention. FIG. 1B is a perspective view showing the display device DD of FIG. 1A in a folded state. FIG. 2B is a perspective view showing the display device DD-1 of FIG. 2A in a folded state.

Referring to FIGS. 1A, 1B, 2A, and 2B, the display devices DD and DD-1 may be foldable display devices. In an embodiment, the display devices DD and DD-1 may be applied to a large-sized electronic item, such as a television set, a monitor, and the like, or a small and medium-sized electronic item, such as a mobile phone, a tablet computer, a game unit, a navigation unit, and the like.

An upper surface of each of the display devices DD and DD-1 may be defined as a display surface DS. The display surface DS may correspond to a plane defined by a first directional axis DR1 and a second directional axis DR2 when the display devices DD and DD-1 are in an unfolded state.

The display surface DS may include a display area DA and a non-display area NDA defined around the display area DA. An image IM is displayed through the display area DA, and the image IM is not displayed through the non-display area NDA. The image IM may include a still image or a motion image. FIGS. 1A and 2A show a plurality of application icons as representative examples of the image IM.

The display area DA may have a quadrangular shape. The non-display area NDA may surround the display area DA. However, they should not be limited thereto or thereby, and the shape of the display area DA and the shape of the non-display area NDA may be designed to have other shapes.

The display device DD may include a first non-folding area NFA1, a folding area FA, and a second non-folding area NFA2, which are defined therein and sequentially arranged in one direction. That is, the folding area FA may be defined between the first non-folding area NFA1 and the second non-folding area NFA2. The display device DD-1 may include a first non-folding area NFA1-1, a folding area FA-1, and a second non-folding area NFA2-1, which are defined therein and sequentially arranged in one direction. That is, the folding area FA-1 may be defined between the first non-folding area NFA1-1 and the second non-folding area NFA2-1.

The display devices DD and DD-1 may be folded about folding axes FX and FX-1, respectively. That is, the folding areas FA and FA-1 may be folded about the folding axes FX and FX-1, respectively. The folding areas FA and FA-1 are portions where deformation may occur when the display devices DD and DD-1 are folded or bent and correspond to bending portions of the display devices DD and DD-1.

Referring to FIGS. 1A and 1B, the folding axis FX may extend in the first directional axis DR1. The folding axis FX may be a short axis substantially parallel to short sides of the display device DD. Referring to FIGS. 2A and 2B, the folding axis FX-1 may extend in the second directional axis DR2. The folding axis FX-1 may be a long axis substantially parallel to long sides of the display device DD-1.

When the display devices DD and DD-1 are folded, the display surfaces corresponding to the first non-folding areas NFA1 and NFA1-1 may face the display surfaces corresponding to the second non-folding areas NFA2 and NFA2-1. Accordingly, the display surface DS may not be exposed to the outside in the folded state of the display devices DD and DD-1, however, the invention is not limited thereto. When the display devices DD and DD-1 are folded, the display surfaces corresponding to the first non-folding areas NFA1 and NFA1-1 may be opposite to the display surfaces corresponding to the second non-folding areas NFA2 and NFA2-1. Accordingly, the display surface DS may be exposed to the outside in the folded state of the display devices DD and DD-1.

FIGS. 1A and 1B show one folding area FA, one first non-folding area NFA1 and one second non-folding area NFA2, and FIGS. 2A and 2B show one folding area FA-1, one first non-folding area NFA1-1, and one second non-folding area NFA2-1, however, the number of the folding areas and the number of the non-folding areas should not be limited thereto or thereby. In an embodiment, each of the display devices DD and DD-1 may include more than two non-folding areas and may include folding areas disposed between the non-folding areas, for example.

Hereinafter, the structure of the display device DD folded about the short axis shown in FIGS. 1A and 1B will be described as a representative example, however, the invention should not be limited thereto or thereby, and details described hereinafter may be applied to the display device DD-1 folded about the long axis.

Figure 3:
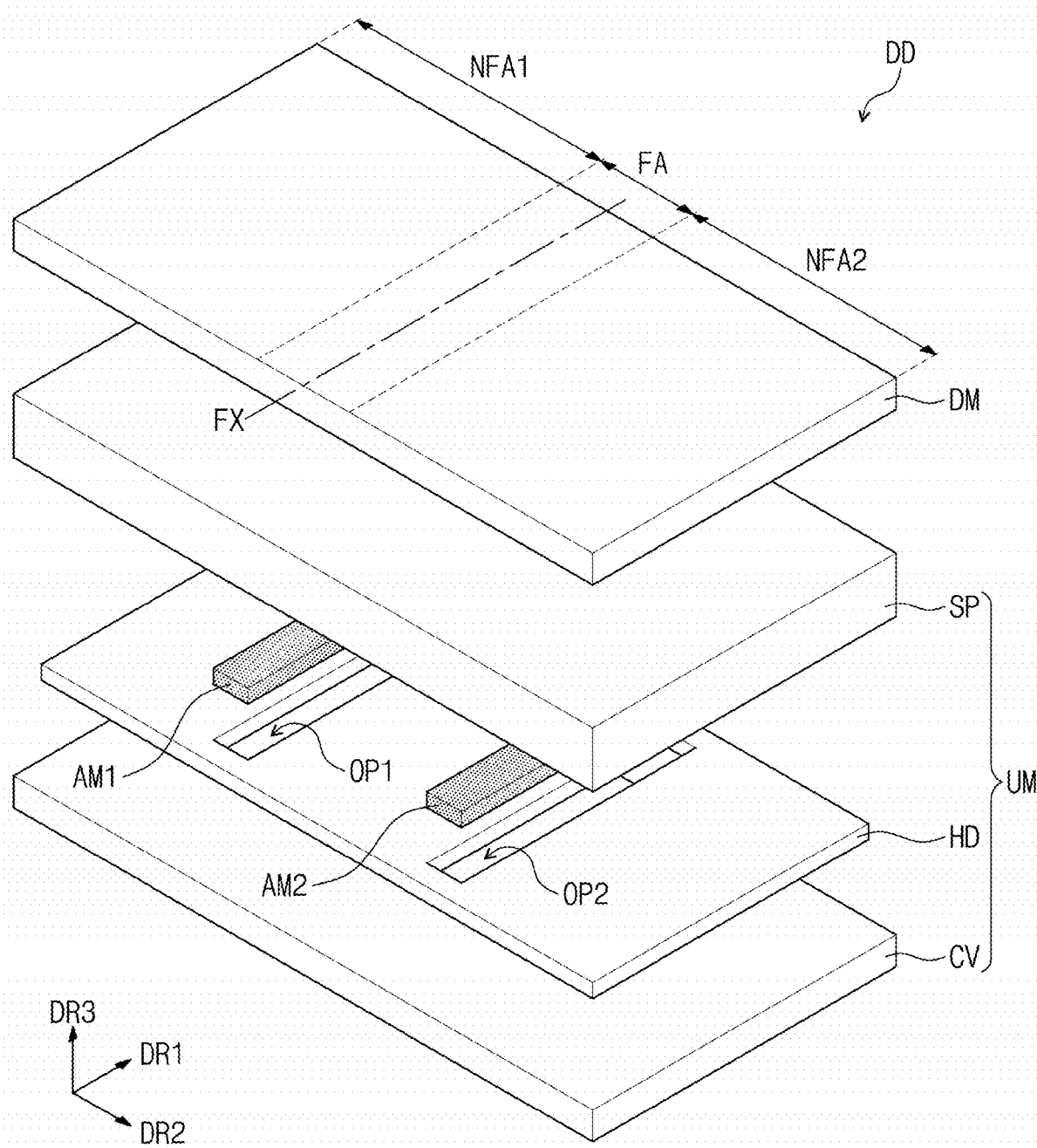
FIG. 3 is an exploded perspective view showing an embodiment of a display device according to the invention.

FIG. 3 is an exploded perspective view showing an embodiment of the display device DD according to the invention. The display device DD may include a display module DM, and a lower module UM disposed under the display module DM. The lower module UM may include a support member SP, a heat dissipation member HD, and a cover member CV. The heat dissipation member HD may be disposed between the support member SP and the cover member CV. Although not shown in drawing figures, the display device DD may further include a case (or housing) to accommodate the display module DM and the cover member CV.

The display module DM may display the image IM (refer to FIG. 1A) and may sense an external input TC (refer to FIG. 1A). The external input TC may be a user input. The user input may include various types of external inputs, such as a part of the user's body, light, heat, pen, or pressure. In FIG. 1A, the external input TC is shown as a user's hand being applied to the display surface DS, however, the invention is not limited thereto. The display module DM may sense the external input TC applied to a side or rear surface of the display device DD depending on its structure, and, it should not be limited to a specific embodiment.

The display module DM may have a quadrangular (e.g., rectangular) shape with short sides extending in the first directional axis DR1 and long sides extending in the second directional axis DR2. The display module DM may include the folding area FA folded about the folding axis FX extending in the first directional axis DR1. The display module DM may include the first non-folding area NFA1, the folding area FA, and the second non-folding area NFA2, which are sequentially arranged in the second directional axis DR2. The first non-folding area NFA1 and the second non-folding area NFA2 may be spaced apart from each other with the folding area FA interposed therebetween.

The support member SP may be disposed under the display module DM. The support member SP may support a rear surface of the display module DM and may protect the display module DM. The support member SP may include a barrier portion that protects the display module DM and has an elasticity advantageous to restore deformation, an impact absorbing portion that absorbs impacts, or a support portion that supports the display module DM and prevents the deformation.

The display device DD may include the heat dissipation member HD disposed under the support member SP. A first opening OP1 and a second opening OP2 may be defined through the heat dissipation member HD. The first opening OP1 may be defined to overlap the first non-folding area NFA1, and the second opening OP2 may be defined to overlap the second non-folding area NFA2.

The display device DD may include a first adhesive member AM1 and a second adhesive member AM2. The first adhesive member AM1 may be disposed in the first opening OP1, and the second adhesive member AM2 may be disposed in the second opening OP2. The bending deformation may occur in an area corresponding to the folding area FA due to repeated folding and unfolding operations of the display device DD by the user, however, the first and second adhesive members AM1 and AM2 may reduce a degree of the bending deformation by controlling the bending deformation.

The cover member CV may be disposed under the heat dissipation member HD to cover the display module DM and the lower module UM. In an embodiment, the cover member CV may have a unitary plate shape. However, they should not be limited thereto or thereby, and the cover member CV may include a plurality of cover portions spaced apart from each other in the folding area FA. The cover member CV may include a metal or plastic material.

FIG. 4 is a cross-sectional view showing an embodiment of the display module DM according to the invention. FIG. 4 shows the cross-section defined by the second directional axis DR2 and a third directional axis DR3. The third directional axis DR3 may be a direction substantially perpendicular to the plane defined by the first directional axis DR1 and the second directional axis DR2.

Referring to FIG. 4, the display module DM may include a display panel DP. The display panel DP may include the folding area FA folded about the folding axis FX extending in the first directional axis DR1. The display panel DP may include the first non-folding area NFA1 and the second non-folding area NFA2 spaced apart from each other with the folding area FA interposed therebetween in the second directional axis DR2.

The display panel DP may be a light emission display panel, however, it should not be particularly limited. In an embodiment, the display panel DP may include a liquid crystal display panel, an organic light emitting display panel, or a quantum dot light emitting display panel, for example.

An input sensing layer (not shown) may be disposed on the display panel DP. The input sensing layer (not shown) may be disposed directly on the display panel DP through successive processes. The input sensing layer (not shown) may include a plurality of insulating layers and a plurality of conductive layers. The conductive layers may form a sensing electrode sensing the external input, a sensing line connected to the sensing electrode, and a sensing pad connected to the sensing line.

As shown in FIG. 4, the display module DM may further include a protective layer PL, a window WM, an anti-reflective layer POL, and a protective film PF. However, the display module DM should not be limited to the structure shown in FIG. 4, and some components included in the display module DM may be omitted.

The anti-reflective layer POL may be disposed on the display panel DP. The anti-reflective layer POL may reduce a reflectance of an external light incident thereto from the above of the window WM. The anti-reflective layer POL in the embodiment of the invention may include a retarder and a polarizer. Each of the retarder and the polarizer may be a film type or liquid crystal coating type. The retarder and the polarizer may further include a protective film.

The anti-reflective layer POL may include color filters. The color filters may have a predetermined alignment. The alignment of the color filters may be determined by taking into account emission colors of pixels included in the display panel DP. The anti-reflective layer POL may further include a black matrix disposed adjacent to the color filters.

The anti-reflective layer POL may include a destructive interference structure. In an embodiment, the destructive interference structure may include a first reflection layer and a second reflection layer, which are disposed on different layers from each other, for example. A first reflection light and a second reflection light, which are respectively reflected by the first reflection layer and the second reflection layer, may interfere destructively with each other, and thus, the reflectance of the external light may be reduced.

The window WM may be disposed on the anti-reflective layer POL. The window WM may protect the display panel DP from external scratch and impact. The image generated by the display panel DP may be provided to the user after passing through the window WM.

The window WM may further include a functional coating layer. The functional coating layer may include at least one of an anti-fingerprint layer, an anti-reflective layer, and a hard coating layer, however, the functional coating layer included in the window WM should not be limited thereto or thereby.

A shape of the window WM may be changed to correspond to a change in shape of the foldable display device DD and may protect the display panel DP even though the shape of the window WM is changed. In an embodiment, the window WM may include a glass material, e.g., an ultra-thin glass ("UTG").

The protective layer PL may be disposed on the window WM. The impact resistance of the display device DD may be improved by the protective layer PL. In an embodiment, the protective layer PL may be a polymer film or a tempered glass film, for example. In another embodiment, the protective layer PL may be omitted.

The protective film PF may be disposed under the display panel DP. The protective film PF may protect a rear surface of the display panel DP. The protective film PF may be a synthetic resin film. In an embodiment, the protective film PF may be a polyimide film or a polyethylene terephthalate film, for example. However, the protective film PF should not be limited thereto or thereby.

The display module DM may further include adhesive layers disposed between the components thereof. The adhesive layers may be disposed between the components, such as the protective layer PL, the window WM, the anti-reflective layer POL, the display panel DP, and the protective film PF, and each adhesive layer may attach components corresponding to each other among the components. In FIG. 4, the display module DM in the embodiment includes an adhesive layer AD1 disposed between the protective layer PL and the window WM and an adhesive layer AD2 disposed between the window WM and the anti-reflective layer POL. However, the display module DM should not be limited thereto or thereby and may further include the adhesive layers, and one of the adhesive layers AD1 and AD2 may be omitted.

Some components included in the display module DM may be provided through successive processes and may be directly disposed without using the adhesive layers. As shown in FIG. 4, the protective film PF and the display panel DP may be successively disposed without using the adhesive layers. In addition, the anti-reflective layer POL may be disposed on the display panel DP without using the adhesive layers. Further, in another embodiment, one of the adhesive layers AD1 and AD2 shown in FIG. 4 may be omitted.

The adhesive layers AD1 and AD2 may include a conventional adhesive. In an embodiment, each of the adhesive layers AD1 and AD2 may include a pressure sensitive adhesive ("PSA"), an optical clear adhesive ("OCA"), or an optical clear resin ("OCR"), for example.

Figure 5:
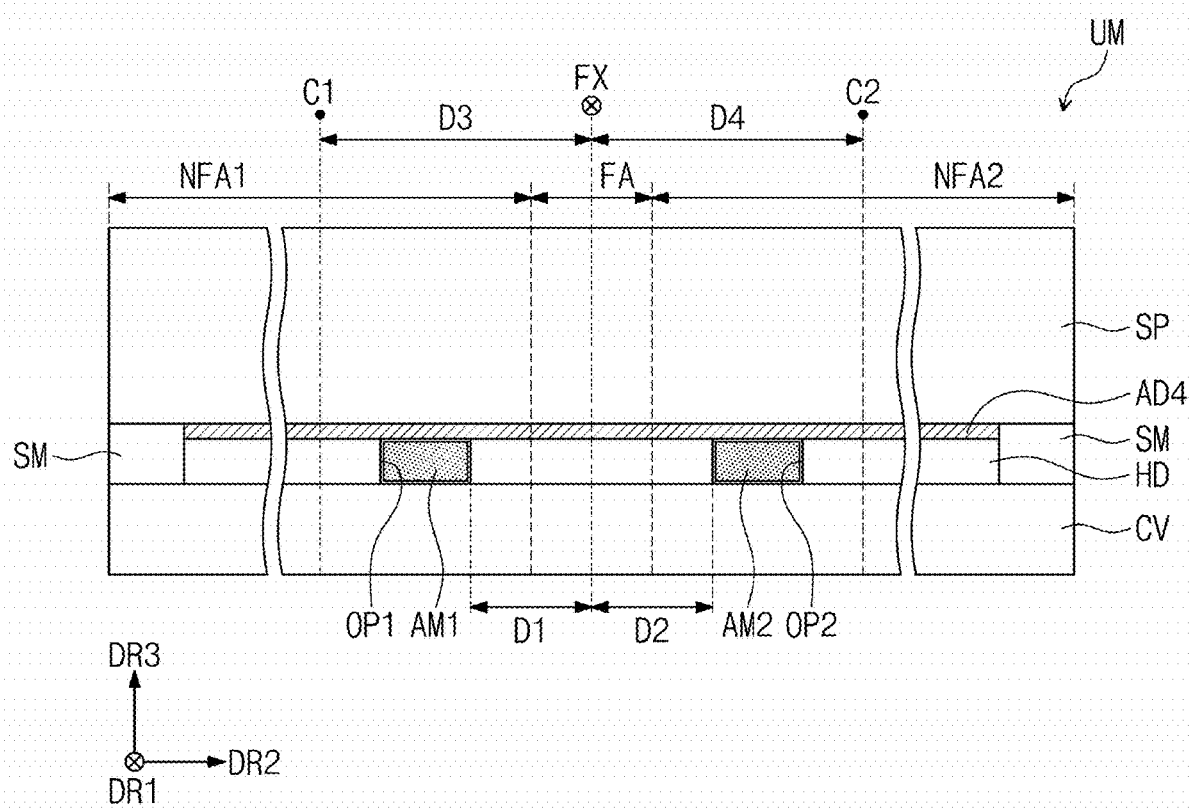
FIG. 5 is a cross-sectional view showing an embodiment of a lower module according to the invention.
Figure 6:
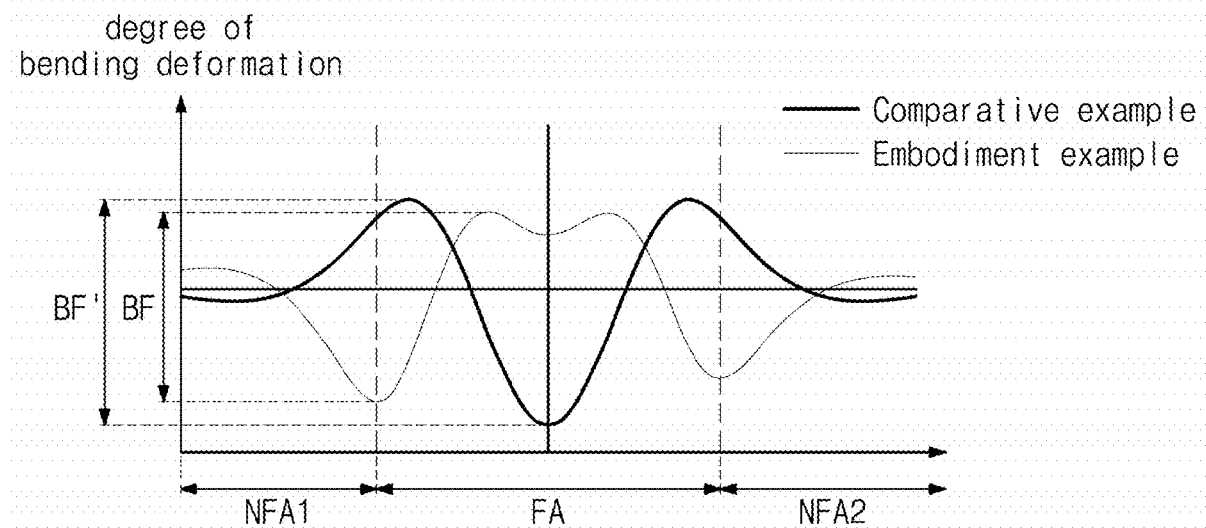
FIG. 6 is a graph showing a degree of bending deformation of a display device in an embodiment example and a comparative example.

FIG. 5 is a cross-sectional view showing an embodiment of the lower module UM according to the invention, and FIG. 6 is a graph showing a degree of bending deformation of a display device in an embodiment example and a comparative example. For the convenience of explanation, the folding area FA, the first non-folding area NFA1, and the second non-folding area NFA2 of the display panel DP shown in FIGS. 5 to 14 (except FIG. 10) are illustrated.

Referring to FIG. 5, the lower module UM may include the support member SP, the heat dissipation member HD, and the cover member CV. The lower module UM may further include an adhesive layer AD4 that attaches the support member SP to the heat dissipation member HD. The lower module UM may further include a step-difference compensation member SM.

The heat dissipation member HD may be disposed between the support member SP and the cover member CV. The first and second openings OP1 and OP2 may be defined through the heat dissipation member HD. The first opening OP1 may overlap the first non-folding area NFA1, and the second opening OP2 may overlap the second non-folding area NFA2.

The lower module UM may include the first adhesive member AM1 and the second adhesive member AM2. The first adhesive member AM1 may be disposed in the first opening OP1, and the second adhesive member AM2 may be disposed in the second opening OP2. The first adhesive member AM1 may overlap the first non-folding area NFA1, and the second adhesive member AM2 may overlap the second non-folding area NFA2.

The first adhesive member AM1 and the second adhesive member AM2 may reduce the degree of the bending deformation in the folding area FA. Referring to FIG. 6, the graph of the comparative example shows a bending deformation shape of the display device that does not include the first adhesive member AM1 and the second adhesive member AM2. The graph of the embodiment example shows a bending deformation shape of the display device that includes the first adhesive member AM1 and the second adhesive member AM2.

The bending deformation shape of the comparative example that does not include the first and second adhesive members AM1 and AM2 may have a seagull shape in which both ends of an area corresponding to the folding area FA are convex upward and a point corresponding to a center of the folding area FA is convex downward. The first adhesive member AM1 and the second adhesive member AM2 may reduce the degree of bending deformation while closely adhering the deformed portion, which is convex upward, toward the cover member CV.

The degree of bending deformation is a gap difference between the point convex upward and the point convex downward. Hereinafter, the degree of bending deformation is also referred to as a deformation degree. The deformation degree BF' of the comparative example may be greater than the deformation degree BF of the embodiment example. As represented by the graphs, the deformation degree of the display device DD may be reduced by disposing the first and second adhesive members AM1 and AM2 between the support member SP and the cover member CV.

The bending deformation shape of the embodiment example that includes the first and second adhesive members AM1 and AM2 may have a shape in which both ends of the area corresponding to the folding area FA are convex downward since the portions that are convex upward of the bending deformation shape in the comparative example are lowered. Accordingly, the area corresponding to the portion that is convex downward in the bending deformation of the comparative example becomes convex upward, and the point corresponding to the center of the folding area becomes convex downward. Accordingly, there are three points that are convex downward in the bending deformation of the embodiment example.

The phenomenon in which the bending deformation is viewed from the outside may be improved by adjusting a curvature value of the convexly deformed point as well as the deformation degree. When the curvature value is substantially large, it means that the bending deformation has occurred steeply, and when the curvature value is substantially small, it means that the bending deformation is relatively gentle. Therefore, when the curvature value is substantially large, the bending deformation may be easily viewed from the outside.

The deformation degree and the curvature value may be controlled by adjusting an interval at which each of the first adhesive member AM1 and the second adhesive member AM2 is disposed. When the interval between the first and second adhesive members AM1 and AM2 increases, the deformation degree increases, and the curvature value decreases. Accordingly, the degree of visual recognition of the bending deformation of the display device DD may be adjusted depending on whether the first and second adhesive members AM1 and AM2 are included and depending on the interval between the first and second adhesive members AM1 and AM2.

Referring to FIG. 5, the first adhesive member AM1 may be spaced apart from the folding axis FX by a first distance D1 in the second directional axis DR2. The second adhesive member AM2 may be spaced apart from the folding axis FX by a second distance D2 in the second directional axis DR2. The first adhesive member AM1 and the second adhesive member AM2 may not overlap the folding area FA.

The first non-folding area NFA1 and the second non-folding area NFA2, which are included in the display panel DP (refer to FIG. 4), have centers C1 and C2, respectively. For the convenience of explanation, the centers C1 and C2 of the first and second non-folding areas NFA1 and NFA2 are respectively shown above the support member SP in FIG. 5.

The first distance D1 may have a maximum value corresponding to a minimum distance D3 between the folding axis FX and the center C1 of the first non-folding area NFA1. The second distance D2 may have a maximum value corresponding to a minimum distance D4 between the folding axis FX and the center C2 of the second non-folding area NFA2.

The first adhesive member AM1 and the second adhesive member AM2 may be spaced apart from each other by a sum of the first distance D1 and the second distance D2. A maximum value of the sum of the first distance D1 and the second distance D2 may correspond to a minimum distance between the center C1 of the first non-folding area NFA1 and the center C2 of the second non-folding area NFA2.

The first adhesive member AM1 and the second adhesive member AM2 may be symmetrical with each other with respect to the folding axis FX. Accordingly, the first distance D1 and the second distance D2 may be substantially the same as each other, however, they should not be limited thereto or thereby. That is, the first distance D1 may be different from the second distance D2.

The degree of bending deformation and the curvature of the bending area may be controlled by adjusting the minimum distances D1 and D2 from the folding axis FX to the first and second adhesive members AM1 and AM2, respectively. As the first and second distances D1 and D2 from the folding axis FX increase, the degree of bending deformation increases, and the curvature of the bending area decreases. Accordingly, the degree of bending deformation and the curvature of the bending area may be controlled by adjusting the distances D1 and D2 of the first and second adhesive members AM1 and AM2, and thus, the phenomenon in which the bending deformation is viewed from the outside may be improved.

Each of the first and second adhesive members AM1 and AM2 may include a conventional adhesive. Each of the first and second adhesive members AM1 and AM2 may include an acrylic-based resin or a silicon-based resin. In an embodiment, each of the first and second adhesive members AM1 and AM2 may include a PSA, an OCA, or an OCR, for example.

The heat dissipation member HD may be disposed under the support member SP to disperse and dissipate heat generated in the display device DD. The heat dissipation member HD may include a heat dissipation sheet. The heat dissipation sheet may include graphite or a graphitized polymer film. In an embodiment, the polymer film may be a polyimide film, for example.

The lower module UM may include the impact absorbing member SA (refer to FIG. 14), which will be described later, rather than the heat dissipation member HD. The impact absorbing member SA (refer to FIG. 14) may absorb impacts applied to the display device DD. The impact absorbing member SA (refer to FIG. 14) may include a sponge, a foam, or a urethane resin.

The support member SP may include a flexible material to increase flexibility of an area corresponding to the folding area FA. In addition, the support member SP may have a folding pattern obtained by patterning the area corresponding to the folding area FA or may include a plurality of support portions spaced apart from each other in the folding area FA.

The lower module UM may include the cover member CV disposed under the support member SP. The cover member CV may cover the display module DM and the lower module UM. The cover member CV may be accommodated in the case (not shown) of the display device DD. The cover member CV may include a plastic or metal material.

The lower module UM may further include the step-difference compensation member SM. The step-difference compensation member SM may be disposed between the support member SP and the cover member CV. The step-difference compensation member SM may be disposed around the heat dissipation member HD.

The step-difference compensation member SM may include a step-difference compensation film or a step-difference compensation adhesive. One surface of the step-difference compensation film may have an adhesion lower than the other surface of the step-difference compensation film. The step-difference compensation film may be a synthetic resin film. The step-difference compensation adhesive may be a PSA. In an embodiment, the step-difference compensation adhesive may include an acrylic-based resin or a silicon-based resin, for example, however, it should not be limited thereto or thereby. The step-difference compensation adhesive may be, but not limited to, a step-difference compensation tape.

The step-difference compensation member SM may have a thickness, in a third direction DR3, that is substantially the same as a sum of a thickness of the adhesive layer AD4 and a thickness of the heat dissipation member HD. The thickness of the heat dissipation member HD may be substantially the same as the thickness of the first and second adhesive members AM1 and AM2. In an embodiment, the thickness of the step-difference compensation member SM may be about 75 micrometers, the thickness of the adhesive layer AD4 may be about 15 micrometers, and the thickness of each of the heat dissipation member HD and the first and second adhesive members AM1 and AM2 may be about 60 micrometers, for example. However, each thickness should not be limited to the above values.

Figure 7:
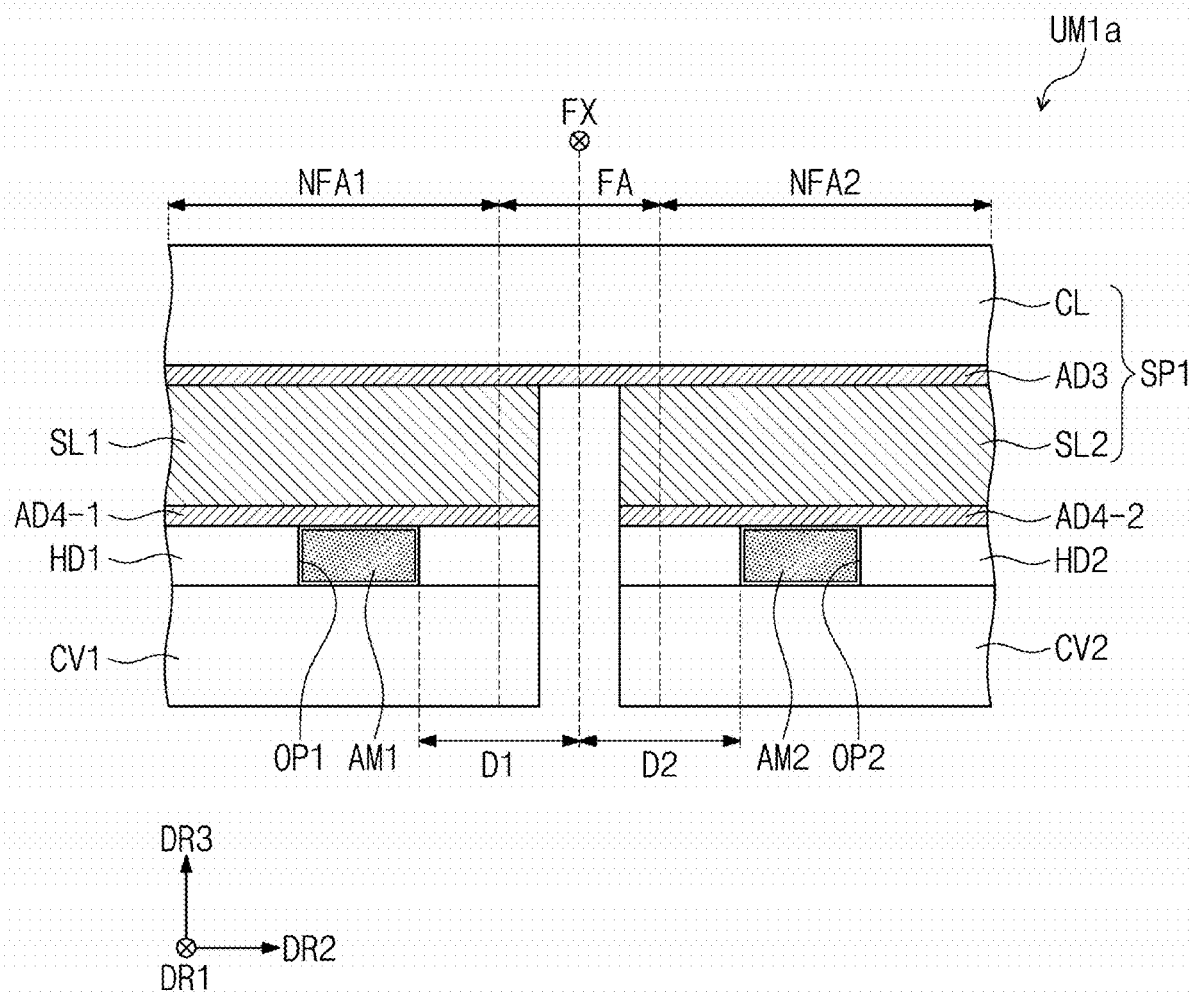
FIG. 7 is a cross-sectional view showing an embodiment of a lower module according to the invention.
Figure 8:
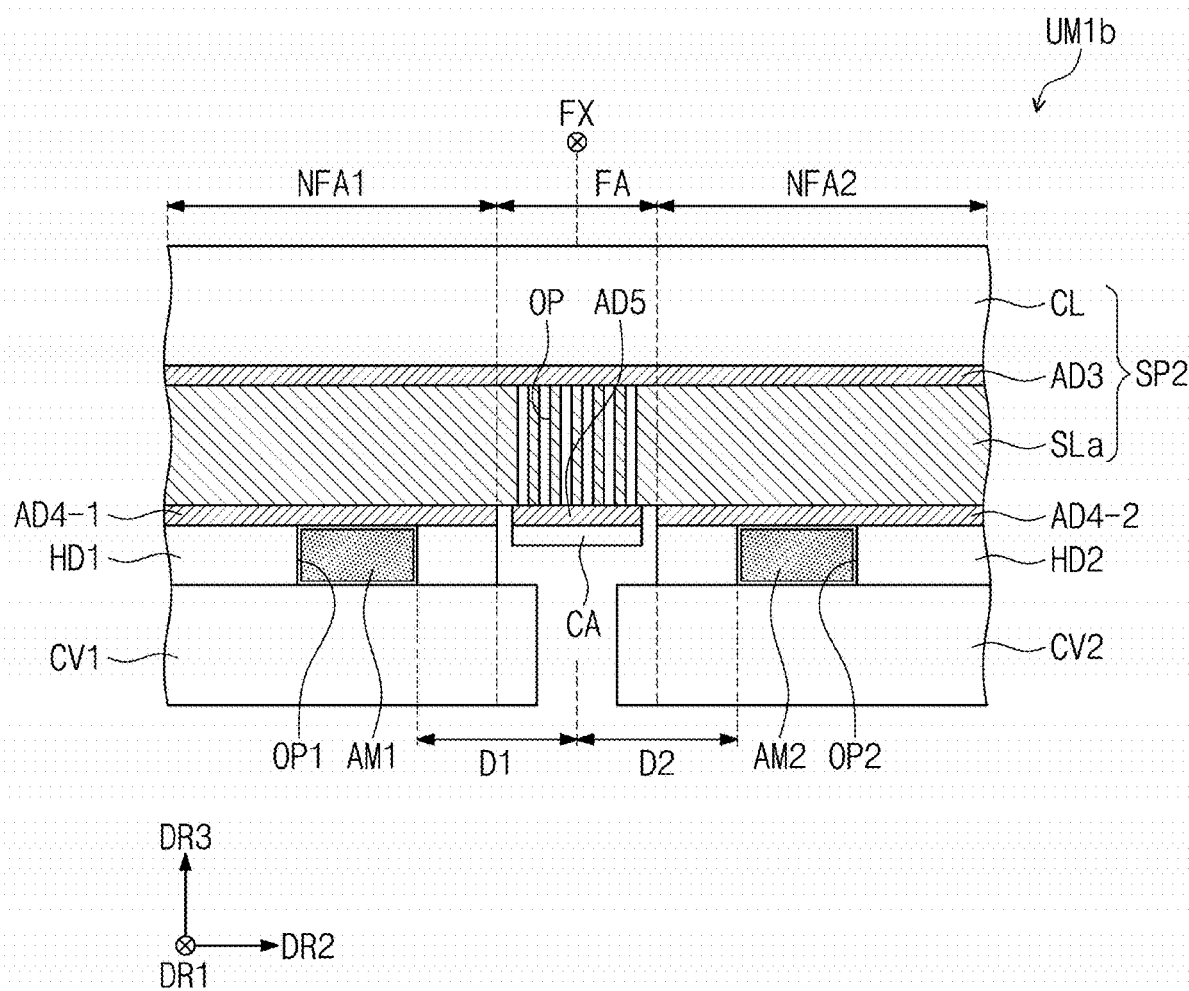
FIG. 8 is a cross-sectional view showing an embodiment of a lower module according to the invention.
Figure 9:
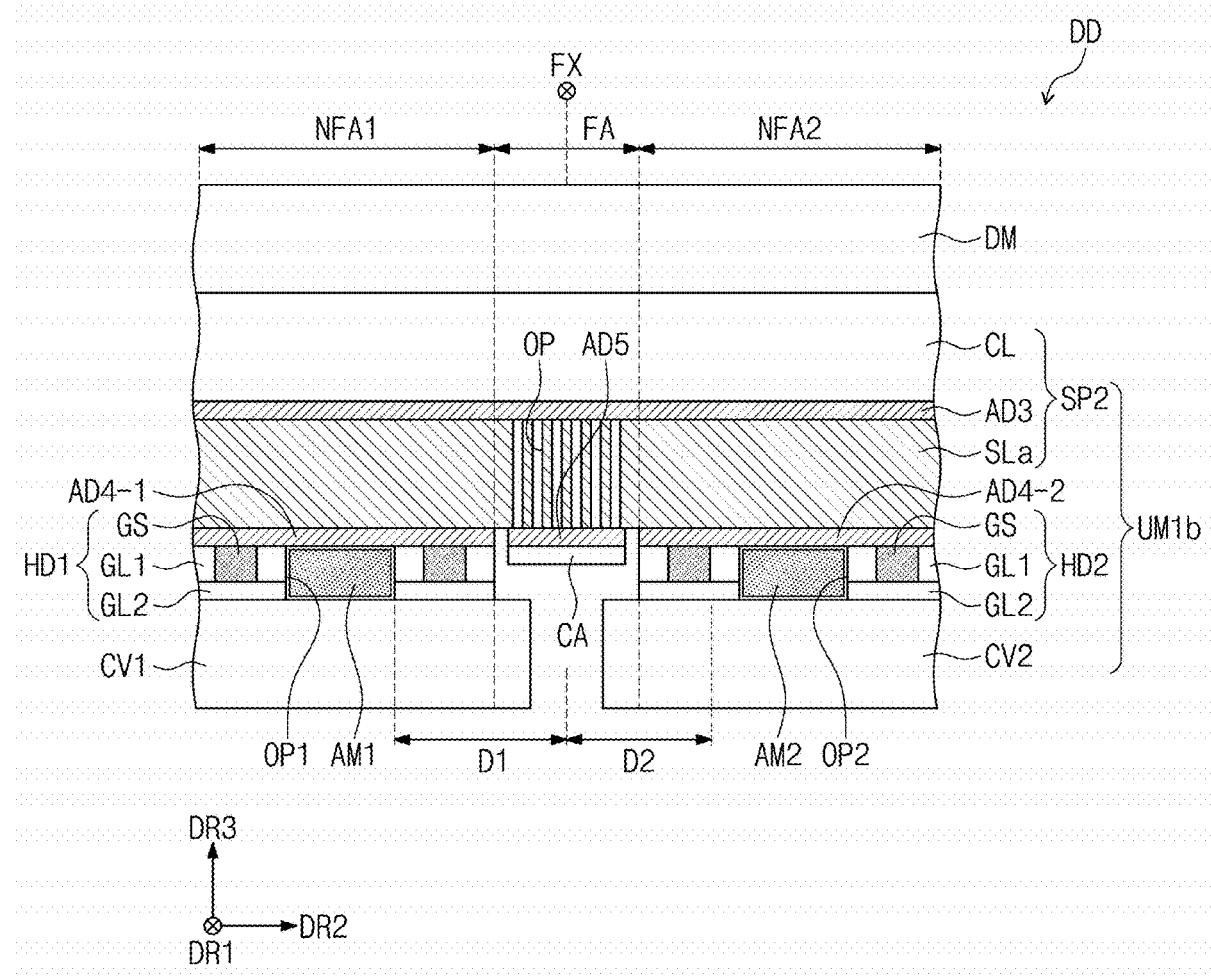
FIG. 9 is a cross-sectional view showing an embodiment of a display device according to the invention.

FIGS. 7 and 8 are cross-sectional views respectively showing embodiments of lower modules UM1a and UM1b according to the invention. FIG. 9 is a cross-sectional view showing an embodiment of a display device DD according to the invention. FIG. 10 is a graph showing variations in a degree of bending deformation of a display device (hereinafter, also referred to as bending deformation degree) and a curvature value in a bending area as a function of a distance at one side of the adhesive member (hereinafter, also referred to as one side distance of the adhesive member).

Referring to FIG. 7, a support member SP1 of the lower module UM1a may include an impact absorbing portion CL and support portions SL1 and SL2. The impact absorbing portion CL may be disposed on the support portions SL1 and SL2.

The support portions SL1 and SL2 included in the support member SP1 may prevent or reduce the bending deformation of the display module DM due to external force. That is, although the external force is applied to the support portions SL1 and SL2, the display module DM may maintain a relatively flat state.

The support member SP1 may include a first support portion SL1 that overlaps the first non-folding area NFA1 and a second support portion SL2 that overlaps the second non-folding area NFA2. Each of the first and second support portions SL1 and SL2 may overlap a portion of the folding area FA.

The first support portion SL1 may be spaced apart from the second support portion SL2 in the second directional axis DR2. The first and second support portions SL1 and SL2 may be spaced apart from each other in the folding area FA. As the first support portion SL1 is spaced apart from the second support portion SL2 in the folding area FA, when the display device DD is folded, the first and second support portions SL1 and SL2 are less affected by stress or tensile force caused by folding the display device DD. Accordingly, the bending deformation degree may be reduced.

Each of the first support portion SL1 and the second support portion SL2 may be a metal plate. In an embodiment, each of the first support portion SL1 and the second support portion SL2 may include stainless steel, aluminum, or alloys thereof, for example.

A heat dissipation member HD may include a first heat dissipation portion HD1 and a second heat dissipation portion HD2. The first heat dissipation portion HD1 may be disposed under the first support portion SL1 and may overlap the first non-folding area NFA1. The second heat dissipation portion HD2 may be disposed under the second support portion SL2 and may overlap the second non-folding area NFA2.

A first opening OP1 may be defined through the first heat dissipation portion HD1, and a second opening OP2 may be defined through the second heat dissipation portion HD2. A first adhesive member AM1 may be disposed in the first opening OP1, and a second adhesive member AM2 may be disposed in the second opening OP2.

The first adhesive member AM1 and the second adhesive member AM2 may be spaced apart from a folding axis FX by a first distance D1 and a second distance D2, respectively. Details on the first and second distances D1 and D2 described with reference to FIGS. 5 and 6 may be applied to the first and second distances D1 and D2 shown in FIG. 7.

The first heat dissipation portion HD1 may be in contact with the first support portion SL1 by an adhesive layer AD4-1, and the second heat dissipation portion HD2 may be in contact with the second support portion SL2 by an adhesive layer AD4-2. However, the invention is not limited thereto, and the adhesive layers AD4-1 and AD4-2 may be omitted.

A cover member CV may include a first cover portion CV1 disposed under the first support portion SL1 and a second cover portion CV2 disposed under the second support portion SL2. The first cover portion CV1 may cover a lower portion of the first support portion SL1, and the second cover portion CV2 may cover a lower portion of the second support portion SL2. Each of the first and second cover portions CV1 and CV2 may include a metal or plastic material.

The support member SP1 may include the impact absorbing portion CL. The impact absorbing portion CL may be disposed on the first and second support portions SL1 and SL2. The impact absorbing portion CL may absorb impacts applied to the support member SP1. The impact absorbing portion CL may be a cushion layer. In an embodiment, the impact absorbing portion CL may include a sponge, a foam, or a urethane resin, for example. The impact absorbing portion CL may be in contact with the support portions SL1 and SL2 by an adhesive layer AD3. However, the invention is not limited thereto, and the adhesive layer AD3 may be omitted.

The adhesive layers AD3, AD4-1 and AD4-2 may include an acrylic-base resin or a silicon-based resin. In an embodiment, the adhesive layers AD3, AD4-1 and AD4-2 may be a PSA, an OCA, or an OCR, for example.

Referring to FIG. 8, a support member SP2 of the lower module UM1b may include an impact absorbing portion CL and a support portion SLa. Details on the impact absorbing portion CL, the adhesive layers AD3, AD4-1, and AD4-2, and the first and second adhesive members AM1 and AM2 shown in FIG. 7 may be applied to the impact absorbing portion CL, adhesive layers AD3, AD4-1, and AD4-2, and adhesive members AM1 and AM2 shown in FIG. 8, The support portion SLa included in the support member SP2 may prevent or reduce the bending deformation of the display module DM due to external force. That is, although the external force is applied to the support portion SLa, the display module DM may maintain a relatively flat state.

A plurality of openings OP may be defined through the support portion SLa in the folding area FA. The openings OP may be spaced apart from each other at a predetermined interval. Accordingly, the support portion SLa may have a folding pattern in the folding area FA. The support portion SLa may be flexibly folded by the openings OP.

The support portion SLa may be, but not limited to, a metal plate. In an embodiment, the support portion SLa may include stainless steel, aluminum, or alloys thereof, for example.

The support portion SLa may further include an adhesive AD5 and a capping layer CA in the folding area FA. The adhesive AD5 may be disposed between the capping layer CA and the support portion SLa to attach the capping layer CA to a rear surface of the support portion SLa.

The capping layer CA may cover the openings OP defined through the support portion SLa. The capping layer CA may prevent a foreign substance from entering the openings OP.

A heat dissipation member HD may include a first heat dissipation portion HD1 and a second heat dissipation portion HD2. Each of the first heat dissipation portion HD1 and the second heat dissipation portion HD2 may be disposed under the support portion SLa. The first heat dissipation portion HD1 may overlap a first non-folding area NFA1, and the second heat dissipation portion HD2 may overlap a second non-folding area NFA2. Each of the first heat dissipation portion HD1 and the second heat dissipation portion HD2 may not overlap the folding area FA, however, it should not be limited thereto or thereby.

A first opening OP1 may be defined through the first heat dissipation portion HD1, and a second opening OP2 may be defined through the second heat dissipation portion HD2. A first adhesive member AM1 may be disposed in the first opening OP1, and a second adhesive member AM2 may be disposed in the second opening OP2.

A cover member CV may include a first cover portion CV1 that at least partially overlaps the first non-folding area NFA1 and a second cover portion CV2 that at least partially overlaps the second non-folding area NFA2. The first cover portion CV1 may cover the first non-folding area NFA1 of the support portion SLa and a portion of the folding area FA, and the second cover portion CV2 may cover the second non-folding area NFA2 of the support portion SLa and a portion of the folding area FA. Each of the first and second cover portions CV1 and CV2 may include a metal or plastic material.

Referring to FIG. 9, the display device DD may include a display module DM and a lower module UM1b. The display module DM may include a display panel DP (refer to FIG. 4) in which a first non-folding area NFA1, a folding area FA, and a second non-folding area NFA2 are defined. The lower module UM1b may include a support member SP2 including an impact absorbing portion CL and a support portion SLa, a plurality of heat dissipation portions HD1 and HD2, and a plurality of cover portions CV1 and CV2. Hereinafter, descriptions of the same components included in the display device as those of FIGS. 3 to 8 will be omitted, and in FIG. 9, the following description focuses on differences between the current and previous embodiments.

Each of the first heat dissipation portion HD1 and the second heat dissipation portion HD2 may include a heat dissipator GS, and a first gap adhesive (e.g., first gap tape) GL1 disposed adjacent to the heat dissipator GS, and a second gap adhesive (e.g., second gap tape) GL2 disposed under the heat dissipator GS. The first gap adhesive GL1 of the first heat dissipation portion HD1 may be disposed between adhesive layer AD4-1 and the second gap adhesive GL2 disposed on the first cover portion CV1. The first gap adhesive GL1 of the second heat dissipation portion HD2 may be disposed between adhesive layer AD4-2 and the second gap adhesive GL2 disposed on the second cover portion CV2.

Each of the first gap adhesive GL1 and the second gap adhesive GL2 may include a plurality of layers. The first and second gap adhesives GL1 and GL2 may include a base, an upper adhesive disposed on an upper surface of the base, and a lower adhesive disposed on a lower surface of the base.

The first gap adhesive GL1 may be disposed around the heat dissipator GS. The heat dissipator GS may be sealed by the adhesive layers AD4-1 and AD4-2 disposed on the heat dissipator GS, the first gap adhesive GL1, and the second gap adhesive GL2.

The heat dissipator GS may include graphite or graphitized polymer film. In an embodiment, the polymer film may be a polyimide film, for example, however, it should not be limited thereto or thereby.

The display device DD may have the bending deformation degree and the curvature value of the bending area, which are varied depending on the first and second distances D1 and D2 corresponding to the one side distance of adhesive members AM1 and AM2. FIG. 10 shows a relation between the one side distance of the first and second adhesive members AM1 and AM2, the bending deformation degree, and the curvature value.

The one side distance of the first and second adhesive members AM1 and AM2 (refer to FIG. 9) of FIG. 10 may correspond to the first distance D1 or the second distance D2 of FIG. 9. The first distance D1 may be a minimum distance between the folding axis FX and the first adhesive member AM1 spaced apart from the folding axis FX in the second directional axis DR2. The second distance D2 may be a minimum distance between the folding axis FX and the second adhesive member AM2 spaced apart from the folding axis FX in the second directional axis DR2.

Referring to FIG. 10, as the one side distance of the first and second adhesive members AM1 and AM2 (refer to FIG. 9) increases, the bending deformation degree increases, and the curvature of the bending area decreases. When the one side distance is equal to or greater than about 40 millimeters (mm), the bending deformation degree steeply increases, and when the one side distance is equal to or smaller than about 10 mm, the curvature steeply increases. When the bending deformation degree and the curvature increase, the degree of visibility of the bending deformation from the outside increases. Accordingly, it is necessary to adjust the one side distance of the first and second adhesive members AM1 and AM2 to an appropriate range.

The first and second adhesive members AM1 and AM2 may not overlap the folding area FA. This is because it is difficult to effectively prevent the display device DD from being deformed to be upwardly convex at a boundary between the folding area FA and the first and second non-folding areas NFA1 and NFA2 when the first and second adhesive members AM1 and AM2 overlap the folding area FA.

When the first and second adhesive members AM1 and AM2 are distant from the folding area FA and are arranged close to an end of the display device DD, the bending deformation degree may significantly increase. Accordingly, as described with reference to FIG. 5, a maximum value of the first distance D1 may correspond to a minimum distance D3 between the folding axis FX and a center C1 of the first non-folding area NFA1, and a maximum value of the second distance D2 may correspond to a minimum distance D4 between the folding axis FX and a center C2 of the second non-folding area NFA2.

In an embodiment, each of the first and second distances D1 and D2 may be equal to or greater than about 15 mm and equal to or smaller than about 35 mm. When each of the first and second distances D1 and D2 is smaller than about 15 mm, the curvature value of the bending area significantly increases, and thus, the bending deformation of the folding area FA may be easily viewed. When each of the first and second distances D1 and D2 is greater than about 35 mm, the bending deformation degree significantly increases, and thus, the difference in the degree of protrusion and depression of the bending portion corresponding to the folding area FA of the display device may increase, so that the bending deformation may be easily viewed.

The distance between the first adhesive member AM1 and the second adhesive member AM2, which corresponds to a sum of the one side distance of the first adhesive member AM1 and the one side distance of the second adhesive member AM2, may affect the bending deformation. The distance between the first adhesive member AM1 and the second adhesive member AM2 may be the sum of the first distance D1 and the second distance D2.

A maximum value of the distance between the first adhesive member AM1 and the second adhesive member AM2 may be the minimum distance between the center C1 of the first non-folding area NFA1 and the center C2 of the second non-folding area NFA2. The distance between the first adhesive member AM1 and the second adhesive member AM2 may be equal to or greater than about 35 mm and equal to or smaller than about 65 mm, and the phenomenon in which the bending deformation is viewed may be effectively improved in the above range.

Table 1 below shows the deformation degree (refer to FIG. 6) and the curvature value of the display device DD shown in FIG. 9 according to the one side distance of the first and second adhesive members AM1 and AM2. The comparative example corresponds to a display device in which the first and second adhesive members AM1 and AM2 are not included.

TABLE 1

| | One side distance of adhesive members(mm) | | | | | | Comparative |
|---|---|---|---|---|---|---|---|
| | 8 | 10 | 12 | 15 | 20 | 30 | example |
| Deformation degree (μm) | 27.6 | 27.8 | 28.0 | 29.8 | 31.5 | 34.7 | 125.9 |
| Curvature (m$^{-1}$) | 10.5 | 9.1 | 8.0 | 6.2 | 5.0 | 4.4 | 1.6 |

According to Table 1, as the one side distance of the adhesive member increases, the deformation degree increases, but the curvature decreases. The expression "the degree deformation increases" means that a difference between the convex upward portion and the convex downward portion becomes larger. The expression "the curvature decreases" means that the bending deformation occurs with more gentle slope.

The deformation degree of the display device of the comparative example is about 125.9 micrometers, and the deformation degree of the display device of the comparative example is substantially greater than that of the display device with the adhesive members. Although the curvature is about 1.6 m$^{-1}$, which is relatively small, the deformation degree is substantially large, so that the bending deformation of the display device may be easily viewed, and reliability of the display device may be lowered.

When the one side distance of the adhesive members decreases, the deformation degree decreases. However, since the curvature increases, the bending deformation of the display device may be easily viewed. When the one side distance of the adhesive members significantly increases, the deformation degree increases, and thus, the bending deformation of the display device may be easily viewed. Accordingly, the adhesive members is desired to have the one side distance in the appropriate range.

Referring to Table 1, when the one side distance of the adhesive members is equal to or greater than about 15 mm and equal to or smaller than about 30 mm, the deformation degree significantly decreases when compared with that of the comparative example, and the curvature does not increase significantly. Accordingly, the bending deformation of the display device may be effectively prevented from being viewed from the outside.

FIGS. 11A to 11D are plan views showing embodiments of heat dissipation members HD-1, HD-2, HD-3, and HD-4 according to the invention. FIGS. 11A to 11D show the plan views in the plane defined by the first directional axis DR1 and the second directional axis DR2. Each of FIGS. 11A to 11D shows an area overlapping the folding area FA, the first non-folding area NFA1, and the second non-folding area NFA2.

Referring to FIGS. 11A to 11D, the first adhesive member AM1 may be spaced apart from the folding axis FX by a first distance D1, and the second adhesive member AM2 may be spaced apart from the folding axis FX by a second distance D2. Descriptions on the first and second distances D1 and D2 with reference to FIGS. 5 to 10 may be applied to the first and second distances D1 and D2 of FIGS. 11A to 11D.

The first and second openings OP1 and OP2 may be defined through the heat dissipation members HD-1, HD-2, HD-3, and HD-4 to respectively overlap the first and second non-folding areas NFA1 and NFA2.

Figure 11A:
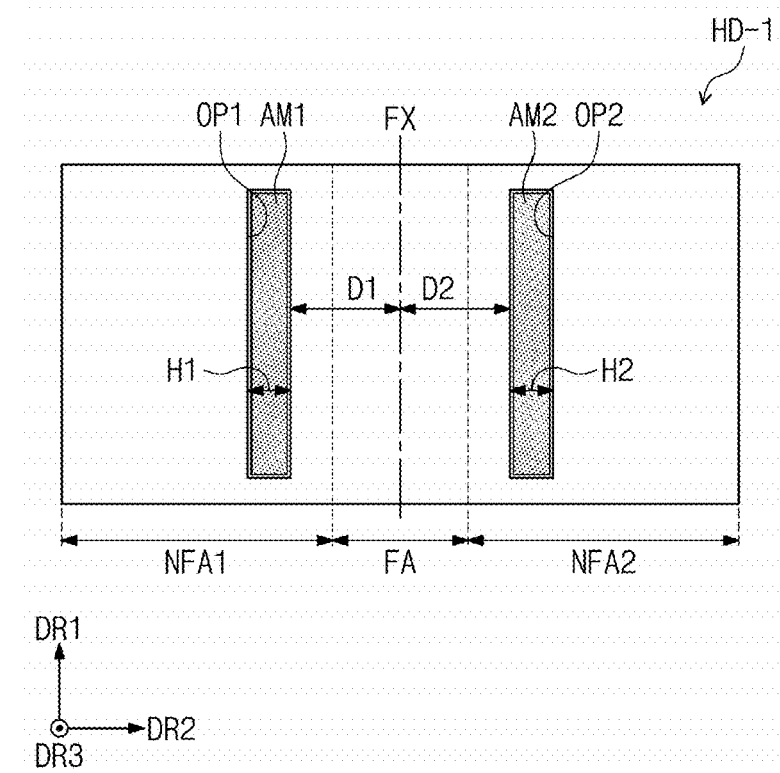
FIG. 11A is a plan view showing an embodiment of a heat dissipation member according to the invention.

Referring to FIG. 11A, the openings OP1 and OP2 defined through the heat dissipation member HD-1 may have a quadrangular shape. In an embodiment, the openings OP1 and OP2 defined through the heat dissipation member HD-1 may have a rectangular shape extending in the first directional axis DR1 substantially parallel to the folding axis FX, for example. The openings OP1 and OP2 defined through the heat dissipation member HD-1 may have the rectangular shape with long sides extending in the first directional axis DR1 and short sides extending in the second directional axis DR2.

The first and second adhesive members AM1 and AM2 disposed in the openings OP1 and OP2 may fill at least a portion of the openings OP1 and OP2. As the embodiment shown in FIG. 11A, the first and second adhesive members AM1 and AM2 may fill an entire space of the openings OP1 and OP2, respectively, however, they should not be limited thereto or thereby. That is, the first and second adhesive members AM1 and AM2 may fill only a portion of the openings OP1 and OP2, respectively.

Figure 11B:
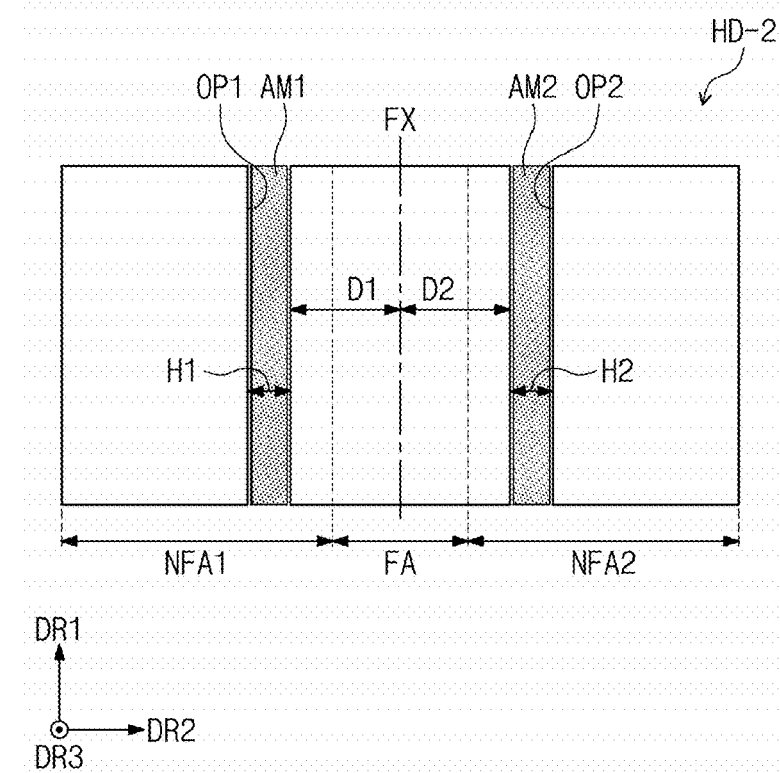
FIG. 11B is a plan view showing an embodiment of a heat dissipation member according to the invention.

Referring to FIG. 11B, the first and second openings OP1 and OP2 defined through the heat dissipation member HD-2 may extend in the first directional axis DR1 substantially parallel to the folding axis FX to both ends of the heat dissipation member HD-2, which are substantially parallel to the second directional axis DR2. Accordingly, an area of the heat dissipation member HD-2, which overlaps the first non-folding area NFA1, may be divided into two areas spaced apart from each other by the first opening OP1. In addition, an area of the heat dissipation member HD-2, which overlaps the second non-folding area NFA2, may be divided into two areas spaced apart from each other by the second opening OP2.

The first and second adhesive members AM1 and AM2 disposed in the openings OP1 and OP2 may fill at least a portion of the openings OP1 and OP2. As the embodiment shown in FIG. 11B, the first and second adhesive members AM1 and AM2 may fill an entire space of the openings OP1 and OP2, respectively. In an embodiment, the first and second adhesive members AM1 and AM2 may be filled to the both ends of the heat dissipation member HD-2, which are substantially parallel to the second directional axis DR2, for example, however, they should not be limited thereto or thereby. That is, the first and second adhesive members AM1 and AM2 may fill only a portion of the openings OP1 and OP2, respectively.

Referring to FIGS. 11A and 11B, each of the first and second adhesive members AM1 and AM2 may have a bar shape. The first and second adhesive members AM1 and AM2 having the bar shape may be disposed such that long sides of the bar shape are substantially parallel to the first directional axis DR1.

The first adhesive member AM1 may have a first width H1 in the second directional axis DR2, and the second adhesive member AM2 may have a second width H2 in the second directional axis DR2. The first width H1 may be the same as or different from the second width H2. Each of the first and second widths H1 and H2 may be in a range from about 5 mm to about 10 mm, however, the first and second widths H1 and H2 should not be limited thereto or thereby.

Figure 11C:
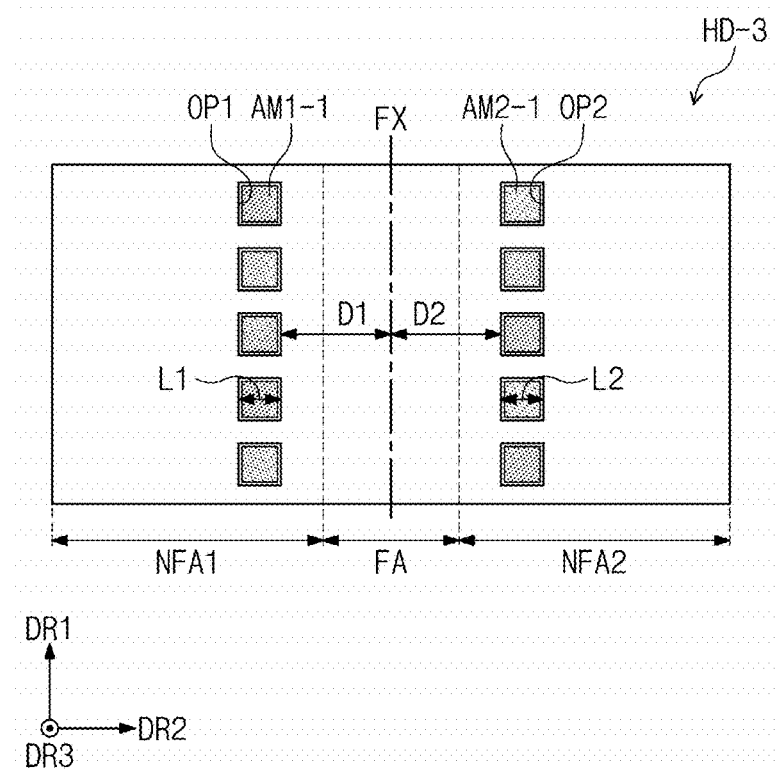
FIG. 11C is a plan view showing an embodiment of a heat dissipation member according to the invention.

Referring to FIG. 11C, each of the first and second openings OP1 and OP2 defined through the heat dissipation member HD-3 may be provided in plural. Each of the first openings OP1 and the second openings OP2 may be arranged in the first directional axis DR1 substantially parallel to the folding axis FX.

The first openings OP1 may be spaced apart from each other at regular intervals, and the second openings OP2 may be spaced apart from each other at regular intervals. However, the first openings OP1 and the second openings OP2 do not necessarily have to be spaced apart at regular intervals from each other. In another embodiment, the first openings OP1 may be spaced apart from each other at different intervals, and the second openings OP2 may be spaced apart from each other at different intervals.

The first openings OP1 may have the same shape as each other or may have different shapes from each other. The second openings OP2 may have the same shape as each other or may have different shapes from each other. As the embodiment shown in FIG. 11C, the first openings OP1 and the second openings OP2 may have substantially the same shape as each other.

Each of the first openings OP1 and the second openings OP2 may have a quadrangular shape, e.g., a square shape, in a plan view. However, the shape of the first openings OP1 and the second openings OP2 should not be limited thereto or thereby.

The first adhesive member AM1 may include a plurality of first adhesive portions AM1-1 spaced apart from each other. The second adhesive member AM2 may include a plurality of second adhesive portions AM2-1 spaced apart from each other. The first adhesive portions AM1-1 may be respectively disposed in the first openings OP1. The second adhesive portions AM2-1 may be respectively disposed in the second openings OP2. The first adhesive portions AM1-1 may be disposed in all or some of the first openings OP1.

The second adhesive portions AM2-1 may be disposed in all or some of the second openings OP2.

Each first adhesive portion AM1-1 may have the same shape as or a different shape from that of a corresponding first opening in which the first adhesive portion AM1-1 is disposed among the first openings OP1. Each second adhesive portion AM2-1 may have the same shape as or a different shape from that of a corresponding second opening in which the second adhesive portion AM2-1 is disposed among the second openings OP2. Each of the first adhesive portions AM1-1 and each of the second adhesive portions AM2-1 may have a quadrangular shape, e.g., a square shape, in a plan view. However, the shape of the first adhesive portions AM1-1 and the second adhesive portions AM2-1 should not be limited thereto or thereby.

Figure 11D:
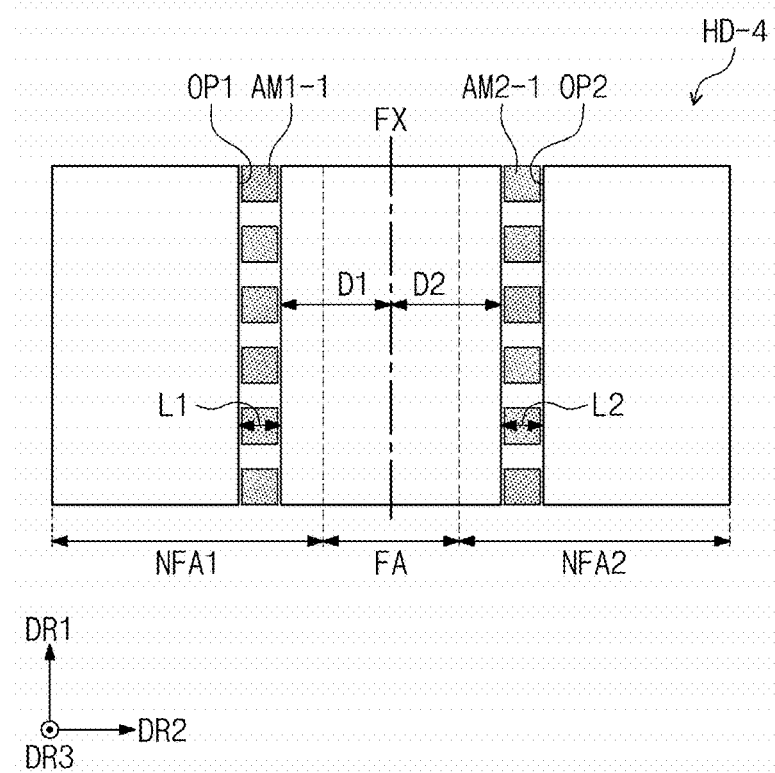
FIG. 11D is a plan view showing an embodiment of a heat dissipation member according to the invention.

Referring to FIG. 11D, the first and second openings OP1 and OP2 defined through the heat dissipation member HD-4 may extend in the first directional axis DR1 substantially parallel to the folding axis FX to both ends of the heat dissipation member HD-4, which are substantially parallel to the second directional axis DR2.

The first adhesive member AM1 may include a plurality of first adhesive portions AM1-1 spaced apart from each other. The second adhesive member AM2 may include a plurality of second adhesive portions AM2-1 spaced apart from each other. The first adhesive portions AM1-1 may be arranged in some portions of the first openings OP1. The second adhesive portions AM2-1 may be arranged in some portions of the second openings OP2.

The first adhesive portions AM1-1 may be arranged in the first directional axis DR1 substantially parallel to the folding axis FX. The second adhesive portions AM2-1 may be arranged in the first directional axis DR1 substantially parallel to the folding axis FX.

The first adhesive portions AM1-1 may be spaced apart from each other at regular intervals, and the second adhesive portions AM2-1 may be spaced apart from each other at regular intervals. However, it is not necessary that the first adhesive portions AM1-1 are arranged at regular intervals and the second adhesive portions AM2-1 are arranged at regular intervals. In another embodiment, the first adhesive portions AM1-1 may be spaced apart from each other at different intervals, and the second adhesive portions AM2-1 may be spaced apart from each other at different intervals.

The first adhesive portions AM1-1 may have the same shape as each other or may have different shapes from each other. The second adhesive portions AM2-1 may have the same shape as each other or may have different shapes from each other. Each of the first adhesive portions AM1-1 and each of the second adhesive portions AM2-1 may have a quadrangular shape, e.g., a square shape, in a plan view. As the embodiment shown in FIG. 11D, each of the first adhesive portions AM1-1 and each of the second adhesive portions AM2-1 may have the square shape.

Referring to FIGS. 11C and 11D, each first adhesive portion AM1-1 may have the square shape with one side length that is a first length L1, and each second adhesive portion AM2-1 may have the square shape with one side length that is a second length L2. The first length L1 may be the same as or different from the second length L2. Each of the first length L1 and the second length L2 may be in a range from about 5 mm to about 10 mm. However, the first and second lengths L1 and L2 should not be limited thereto or thereby.

The first adhesive member AM1 and the second adhesive member AM2 may be symmetrical with each other with respect to the folding axis FX. The first adhesive portions AM1-1 included in the first adhesive member AM1 and the second adhesive portions AM2-1 included in the second adhesive member AM2 may be symmetrical with each other with respect to the folding axis FX.

Although the first and second openings OP1 and OP2 and the first and second adhesive members AM1 and AM2 defined in various forms have been described with reference to FIGS. 11A to 11D, the shapes of the first and second openings OP1 and OP2 and the first and second adhesive members AM1 and AM2 should not be limited thereto or thereby.

Figure 14:
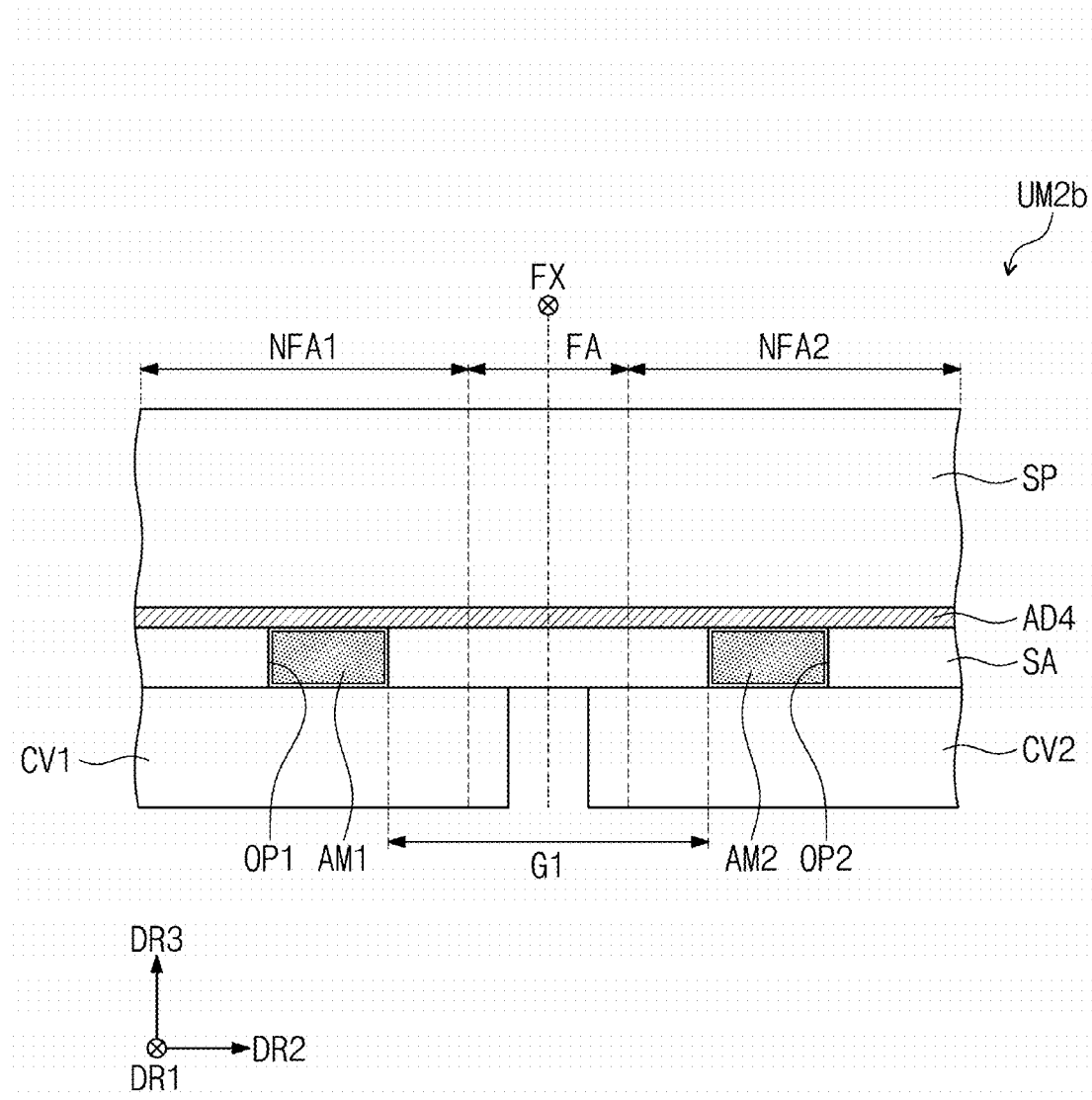
FIG. 14 is a cross-sectional view showing an embodiment of a lower module according to the invention.

Descriptions on the heat dissipation members HD-1, HD-2, HD-3, and HD-4 with reference to FIG. 11A to 11D may be applied to the impact absorbing member SA (refer to FIG. 14). Descriptions described with reference to FIGS. 11A to 11D may be applied to the first adhesive member AM1 disposed in the first opening OP1 and the second adhesive member AM2 disposed in the second opening OP2, which are defined through the impact absorbing member SA (refer to FIG. 14).

Figure 12:
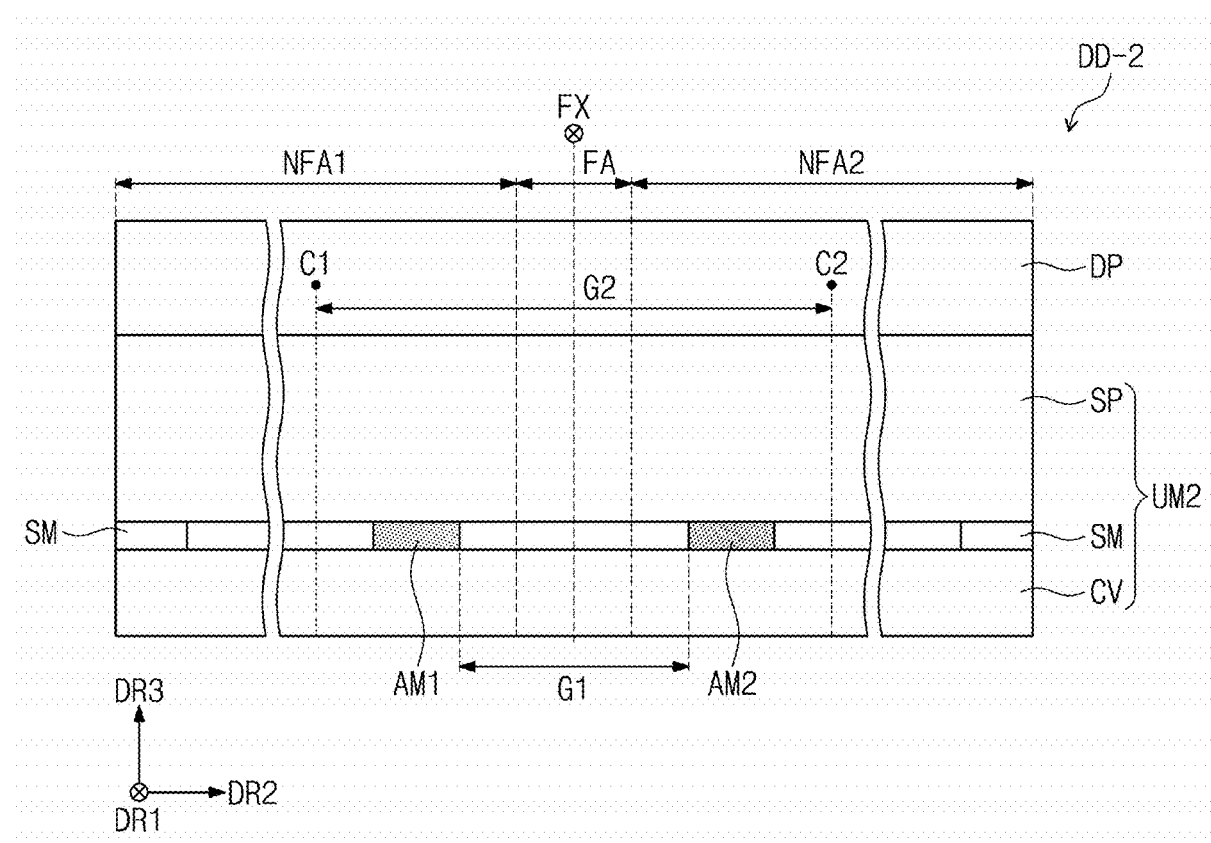
FIG. 12 is a cross-sectional view showing an embodiment of a display device according to the invention.
Figure 13:
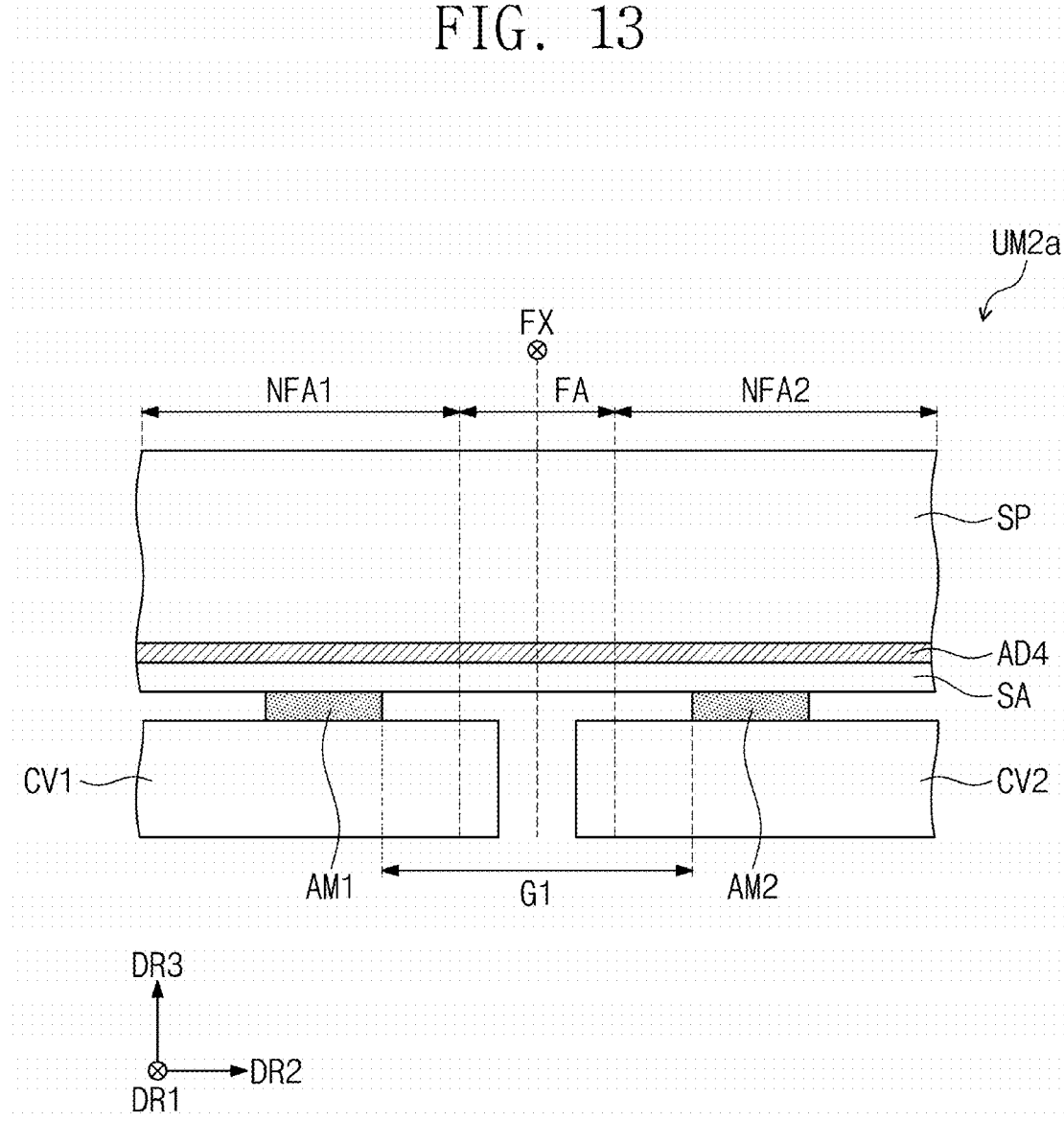
FIG. 13 is a cross-sectional view showing an embodiment of a lower module according to the invention.

FIG. 12 is a cross-sectional view showing an embodiment of a display device DD-2 according to the invention, and FIGS. 13 and 14 are cross-sectional views respectively showing embodiments of lower modules UM2a and UM2b according to the invention.

Referring to FIG. 12, the display device DD-2 may include a display panel DP. The display panel DP may include a folding area FA folded about a folding axis FX extending in the first directional axis DR1 and first and second non-folding areas NFA1 and NFA2 spaced apart from each other with the folding area FA interposed therebetween in the second directional axis DR2.

The display device DD-2 may include a cover member CV disposed under the display panel DP to cover the display panel DP. The cover member CV may include a metal or plastic material.

A support member SP may be disposed under the display panel DP. The support member SP may prevent the bending deformation of the display panel DP due to a folding operation or external force. Although not shown in FIG. 12, the display device DD-2 may further include a protective film (not shown) disposed between the display panel DP and the support member SP.

A lower module UM2 of the display device DD-2 may include first and second adhesive members AM1 and AM2 disposed between the support member SP and the cover member CV. The first adhesive member AM1 may overlap the first non-folding area NFA1. The second adhesive member AM2 may overlap the second non-folding area NFA2. The first and second adhesive members AM1 and AM2 included in the display device DD-2 may reduce a bending deformation degree of the display device DD-2.

The first adhesive member AM1 may be spaced apart from the second adhesive member AM2 by a first gap G1 in the second directional axis DR2. A degree in reduction of the bending deformation and a curvature value of a bending portion may be affected by the first gap G1. As the first gap G1 increases, the degree in reduction of the bending deformation may decrease. Accordingly, a maximum value of the first gap G1 may correspond to a minimum distance G2 between a center C1 of the first non-folding area NFA1 and a center C2 of the second non-folding area NFA2.

The display device DD-2 may further include a step-difference compensation member SM. The step-difference compensation member SM may include a step-difference compensation film or a step-difference compensation adhesive. The step-difference compensation member SM may be disposed between the support member SP and the cover member CV. The step-difference compensation member SM may be spaced apart from the first and second adhesive members AM1 and AM2 and may be disposed on an upper surface of the cover member CV to correspond to an edge of the cover member CV.

Referring to FIGS. 13 and 14, the lower modules UM2a and UM2b may further include the impact absorbing member SA. The impact absorbing member SA may absorb impacts applied to the display device DD-2. The impact absorbing member SA may include the sponge, the foam, or the urethane resin.

Referring to FIG. 13, the impact absorbing member SA may be disposed under the support member SP. The impact absorbing member SA may be disposed between the support member SP and the first and second adhesive members AM1 and AM2. That is, the first and second adhesive members AM1 and AM2 disposed on the same layer may be disposed under the impact absorbing member SA.

Referring to FIG. 14, first and second openings OP1 and OP2 may be defined through the impact absorbing member SA. The first opening OP1 may be defined to overlap the first non-folding area NFA1. The second opening OP2 may be defined to overlap the second non-folding area NFA2. The first adhesive member AM1 may be disposed in the first opening OP1, and the second adhesive member AM2 may be disposed in the second opening OP2.

The support member SP may include a support portion and an impact absorbing portion disposed on the support portion. Although not shown in FIG. 14, The support portion may include the first support portion SL1 and the second support portion SL2 spaced apart from the first support portion SL1 as the lower module UM1a shown in FIG. 7. The support portion may be the support portion SLa through which the openings OP are defined in an area overlapping the folding area FA as the lower module UM1b shown in FIG. 8.

The cover member CV may include a first cover portion CV1 overlapping at least a portion of the first non-folding area NFA1 and a second cover portion CV2 overlapping at least a portion of the second non-folding area NFA2. The first cover portion CV1 may cover the first non-folding area NFA1 and a portion of the folding are a FA of the impact absorbing member SA, and the second cover portion CV2 may cover the second non-folding area NFA2 and a portion of the folding area FA of the impact absorbing member SA.

Although not shown in FIG. 14, the impact absorbing member SA may include a plurality of impact absorbing portions. One impact absorbing portions may be disposed under the support member SP and may overlap the first non-folding area NFA1. The other impact absorbing portions may be disposed under the support member SP and may overlap the second non-folding area NFA2. The impact absorbing portions may be spaced apart from each other in the folding area FA.

Each of the first and second adhesive members AM1 and AM2 may include an acrylic-based resin or a silicon-based resin. In an embodiment, each of the first and second adhesive members AM1 and AM2 may include a PSA, an OCA, or an OCR, for example.

Although not shown in FIG. 14, similar to the embodiments shown in FIGS. 11C and 11D, the first adhesive member AM1 may include a plurality of first adhesive portions AM1-1, and the second adhesive member AM2 may include a plurality of second adhesive portions AM2-1. The first adhesive portions AM1-1 may be disposed under the impact absorbing member SA or may be disposed in the first opening OP1 defined through the impact absorbing member SA. The second adhesive portions AM2-1 may be disposed under the impact absorbing member SA or may be disposed in the second opening OP2 defined through the impact absorbing member SA.

The lower modules UM2a and UM2b may further include an adhesive layer AD4 disposed between the impact absorbing member SA and the support member SP. The adhesive layer AD4 may attach the impact absorbing member SA to the support member SP.

When compared with the display device that does not include the first and second adhesive members AM1 and AM2, the bending deformation degree of the display device in the embodiment may be reduced. However, the curvature of the bending area may increase depending on positions of the first and second adhesive members AM1 and AM2 included in the display device DD-2. Accordingly, the bending deformation degree may significantly decrease and the curvature of the bending area may not remarkably increase by adjusting the first gap G1. The first gap G1 may be equal to or greater than about 35 mm and equal to or smaller than about 65 mm The display device in the embodiment may include the adhesive members disposed under the support member and spaced apart from each other, and thus, the bending deformation degree of the bending area of the display device may decrease. The bending deformation degree of the bending area and the curvature of the bending area may be controlled by adjusting the intervals between the adhesive members, and thus, the phenomenon in which the bending deformation is viewed from the outside of the display device may be improved.

Although the embodiments of the invention have been described, it is understood that the invention should not be limited to these embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A display device comprising:
   a display panel comprising a folding area folded about a folding axis extending in a first direction, a first non-folding area, and a second non-folding area spaced apart from the first non-folding area with the folding area interposed therebetween in a second direction crossing the first direction;
   a cover member disposed on the display panel;
   a support member disposed between the display panel and the cover member;
   a heat dissipation member which is disposed between the support member and the cover member and through which a first opening and a second opening are defined;
   a first adhesive member disposed in the first opening; and
   a second adhesive member disposed in the second opening,
   wherein the first adhesive member overlaps the first non-folding area, and the second adhesive member overlaps the second non-folding area.

2. The display device of claim 1, wherein each of the first adhesive member and the second adhesive member does not overlap the folding area.

3. The display device of claim 1, wherein the first adhesive member is spaced apart from the folding axis by a first distance in the second direction, the second adhesive member is spaced apart from the folding axis by a second distance in a direction opposite to the second direction, a maximum value of the first distance corresponds to a minimum distance between the folding axis and a center of the first non-folding area, and a maximum value of the second distance corresponds to a minimum distance between the folding axis and a center of the second non-folding area.

4. The display device of claim 3, wherein each of the first and second distances is equal to or greater than about 15 millimeters and equal to or smaller than about 35 millimeters.

5. The display device of claim 3, wherein a maximum value of a sum of the first distance and the second distance corresponds to a distance between the center of the first non-folding area and the center of the second non-folding area.

6. The display device of claim 3, wherein a sum of the first distance and the second distance is equal to or greater than about 35 millimeters and equal to or smaller than about 65 millimeters.

7. The display device of claim 1, wherein each of the first adhesive member and the second adhesive member has a bar shape.

8. The display device of claim 7, wherein each of the first adhesive member and the second adhesive member is disposed substantially parallel to the first direction.

9. The display device of claim 1, wherein the first adhesive member comprises a plurality of first adhesive portions spaced apart from each other, and the second adhesive member comprises a plurality of second adhesive portions spaced apart from each other.

10. The display device of claim 9, wherein each of the first opening and the second opening is provided in plural, the plurality of first adhesive portions is respectively disposed in first openings, and the plurality of second adhesive portions is respectively disposed in second openings.

11. The display device of claim 9, wherein the plurality of first adhesive portions and the plurality of second adhesive portions are arranged substantially parallel to the first direction.

12. The display device of claim 1, wherein the first adhesive member and the second adhesive member are symmetrical with each other with respect to the folding axis.

13. The display device of claim 1, wherein the heat dissipation member comprises:
 a first heat dissipation portion which overlaps at least a portion of the first non-folding area; and
 a second heat dissipation portion which is spaced apart from the first heat dissipation portion and overlaps at least a portion of the second non-folding area,
 the first opening is defined through the first heat dissipation portion, and
 the second opening is defined through the second heat dissipation portion.

14. The display device of claim 1, wherein the support member comprises:
 a first support portion which overlaps the first non-folding area; and
 a second support portion which is spaced apart from the first support portion and overlaps the second non-folding area.

15. The display device of claim 1, wherein the support member comprises a support portion through which a plurality of openings is defined in an area corresponding to the folding area.

* * * * *